US006796515B2

(12) United States Patent
Heren et al.

(10) Patent No.: US 6,796,515 B2
(45) Date of Patent: Sep. 28, 2004

(54) ONE TOUCH ACTUATED VALVE

(75) Inventors: Lawrence P. Heren, East Peoria, IL (US); Scott Jacobs, Bloomington, IL (US); Timothy R. Casica, Peoria, IL (US)

(73) Assignee: L. R. Nelson Corporation, Peoria, IL (US)

( * ) Notice: Subject to any disclaimer, the term of this patent is extended or adjusted under 35 U.S.C. 154(b) by 0 days.

(21) Appl. No.: 10/741,784

(22) Filed: Dec. 19, 2003

(65) Prior Publication Data

US 2004/0135013 A1 Jul. 15, 2004

Related U.S. Application Data

(62) Division of application No. 10/400,031, filed on Mar. 26, 2003, now Pat. No. 6,691,937, which is a continuation of application No. 09/872,582, filed on Jun. 4, 2001, now Pat. No. 6,659,373.

(51) Int. Cl.$^7$ .................................................. B05B 7/02
(52) U.S. Cl. ........................ 239/526; 239/570; 239/574; 251/38; 251/45
(58) Field of Search ................................ 239/526, 525, 239/527, 570, 574, 390, 391, 392; 251/38, 46, 45, 285

(56) References Cited

U.S. PATENT DOCUMENTS

| | | | |
|---|---|---|---|
| 2,243,957 A | | 6/1941 | Heine et al. |
| 2,795,391 A | * | 6/1957 | Krone et al. .................. 251/38 |
| 3,220,695 A | | 11/1965 | Downey et al. |
| 3,333,815 A | | 8/1967 | Downey et al. |
| 3,478,780 A | | 11/1969 | Gheen |
| 3,652,053 A | | 3/1972 | Poitras et al. |
| 3,784,154 A | | 1/1974 | Ostrowski et al. |
| 3,957,244 A | | 5/1976 | Chauvigne |
| 4,014,365 A | | 3/1977 | Peterson et al. |

(List continued on next page.)

FOREIGN PATENT DOCUMENTS

| | | |
|---|---|---|
| DE | 29 02 410 | 7/1980 |
| EP | 0888709 A1 | 1/1999 |

OTHER PUBLICATIONS

Nelson, 1997, Turf Irrigation Products Catalog, pp. 38–40.

*Primary Examiner*—Dinh Q. Nguyen
(74) *Attorney, Agent, or Firm*—Mayer, Brown, Rowe & Maw

(57) ABSTRACT

A one touch valve for activating fluid flow between an inlet conduit and an outlet conduit is disclosed. The valve has a flow cylinder defining an inflow chamber in fluid communication with the inlet conduit and an outflow chamber in fluid communication with the outlet conduit. The flow cylinder includes an end plate and an intermediate plate having a center collar with an aperture. A flexible diaphragm is provided with a sealing surface in contact with the collar to create a seal. The diaphragm has an edge coupled to the intermediate plate and a small diameter hole providing fluid contact between the inflow chamber and an intermediate chamber which is defined by the intermediate plate of the flow cylinder. A plunger is placed on the diaphragm to create a seal with the opposite surface of the diaphragm from the sealing surface. A shaft has one end connected to the plunger and extends through the aperture of the diaphragm. A spring is located between the end plate of the flow cylinder and the contact surface of the plunger. Pushing the shaft causes the plunger to separate from the diaphragm creating fluid pressure on the diaphragm contact surface to push the plunger toward the end plate end, compressing the spring, and causing the diaphragm to separate from the collar causing fluid to flow from the inflow chamber through the aperture to the outflow chamber. Releasing the shaft causes the spring to decompress, forcing the plunger and diaphragm away from the end plate re-establishing the seal between the sealing surface with the collar preventing fluid flow from the intermediate chamber to the outflow chamber.

9 Claims, 18 Drawing Sheets

U.S. PATENT DOCUMENTS

| | | |
|---|---|---|
| 4,193,553 A | 3/1980 | Kelly et al. |
| 4,221,238 A | 9/1980 | Madsen |
| 4,241,759 A | 12/1980 | Billeter |
| 4,283,040 A | 8/1981 | Kolze |
| 4,456,222 A | 6/1984 | Shen |
| 4,708,264 A | 11/1987 | Bruninga |
| 4,734,089 A | 3/1988 | Cullis |
| 4,771,985 A | 9/1988 | Gross et al. |
| 4,934,995 A | 6/1990 | Cullis |
| 5,095,944 A | 3/1992 | Hochstrasser |
| 5,332,159 A | 7/1994 | Grime et al. |
| 5,456,448 A | 10/1995 | Chou |
| 5,546,983 A | 8/1996 | Clare |
| 5,564,673 A | 10/1996 | Pieren |
| 5,599,003 A * | 2/1997 | Seemann et al. ........ 251/30.03 |
| 5,704,397 A | 1/1998 | Lu |
| 5,738,138 A | 4/1998 | Grunert et al. |
| 5,904,334 A | 5/1999 | Grunert et al. |
| 5,967,421 A | 10/1999 | Wang |
| 6,131,608 A | 10/2000 | Lu |
| 6,173,911 B1 | 1/2001 | Hui-Chen |
| 6,290,203 B1 * | 9/2001 | Kolze ...................... 251/30.03 |
| 6,352,212 B1 | 3/2002 | Wang |

* cited by examiner

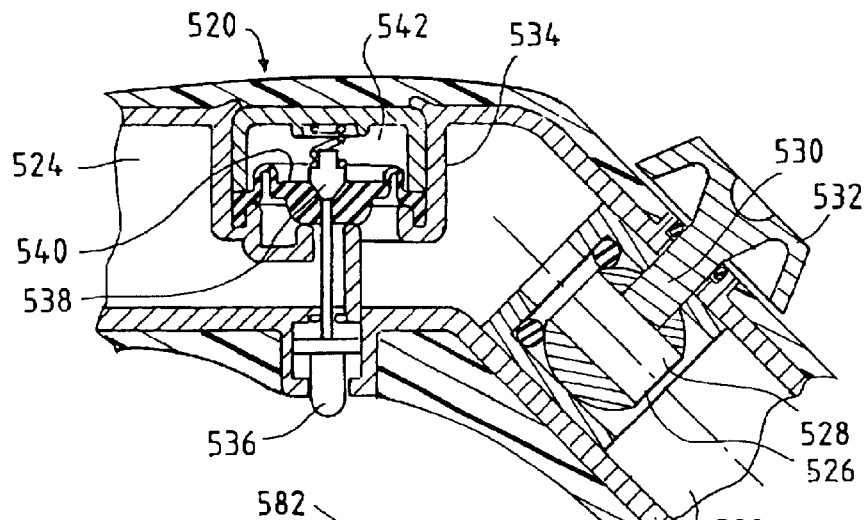
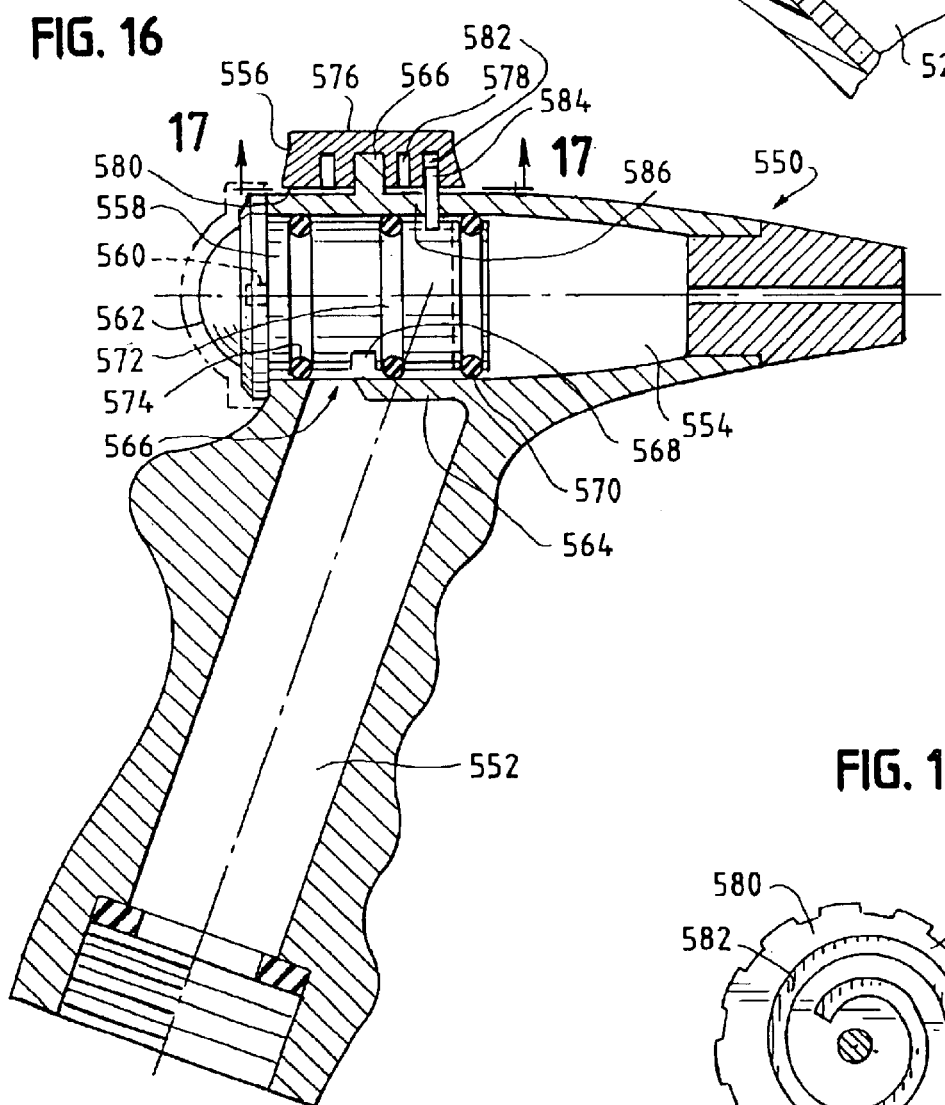
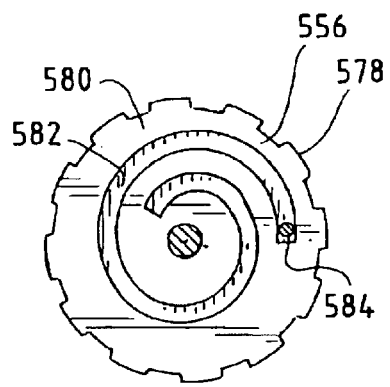

ONE TOUCH ACTUATED VALVE

RELATED APPLICATIONS

This application is a division of application Ser. No. 10/400,031 filed on Mar. 26, 2003, now U.S. Pat. No. 6,691,937, which is a continuation of application Ser. No. 09/872,582 filed on Jun. 4, 2001, now U.S. Pat. No. 6,659,373.

FIELD OF INVENTION

This invention relates to a valve having one touch control. More specifically, this invention relates to a valve control which requires a light one touch to fully open and close the valve.

BACKGROUND OF INVENTION

Irrigation over small areas has involved the use of a hose having one end connected to a sillcock and moving the opposite open end of the hose to direct the water to desired areas. Using the sillcock, water flow may be turned on or cut off to the opposite open end of the hose. Additionally, the rate of water flow may be regulated by turning the sillcock. However, this method of flow control is impractical as often the hose is extended a distance from the sillcock making it inconvenient to return to the sillcock to turn water flow on or off or adjust the flow rate. Additionally, the open end of the hose only issues water in a continuous stream. Thus, various irrigation devices with flow control were developed to be connected to the open end of a hose. With such irrigation devices, the sillcock could be turned on to provide full water flow while the user had local control of the flow using the irrigation device.

Typically, one such irrigation device is a pistol-grip hose nozzle. A typical pistol-grip nozzle includes a tubular body having a handle portion connectable at one end to the garden hose. The body has a fixed barrel portion extending from the opposite end of the hose connector at an angle similar to the angle between a pistol's handle and barrel. The water stream issues from the nozzle at the forward end of the barrel. Both the activation and cutoff of the flow and the flow rate of the water stream are determined by a valve which has an aperture which may be aligned to regulate water flow. The valve may be controlled by a valve stem extending through the barrel portion and outwardly through the rear end thereof. The movement of the valve stem is controlled by a pivoted trigger lever which enables the user to grip the handle portion and put their palm on the trigger to adjust the water stream issuing from the nozzle. A spring maintains the trigger lever in an outward position keeping the valve closed. By squeezing the trigger lever, a user will cause water to flow out of the barrel portion.

However, such trigger hose nozzles require continuous pressure on the lever to maintain fluid flow. This results in fatigue eventually for long term use. Also such pressure is difficult to maintain and does not permit full attention to the control of the fluid flow rate.

Certain pistol-grip type hose nozzles allow a user to separately control the pattern of the water stream and flow cutoff. In these nozzles, a bail is utilized to lock the trigger into a fully open position. A flow control knob is located on the nozzle body separately from the trigger. Rotating the knob varies the fluid flow rate in the valve by rotating a flow cylinder. The flow cylinder has an outlet to the barrel and a port which is accessed by the flow in the handle portion by opening the valve. Once the knob is turned, the flow cylinder rotates and exposes some or all of the port to water flow thus varying the flow rate. The bail affords ease of use because the user does not have to keep constant pressure on the trigger. Additionally, a user may operate the pistol nozzle with only one hand since only one hand is required both to hold the nozzle and rotate the knob to actuate the water stream.

However, these nozzles still depend on initial squeezing pressure to lock the trigger into place. Additionally, the user does not have instantaneous control over the fluid flow.

Thus, there exists a need for a one touch valve which activates or stops water flow from a single actuation. There also exists a need for a valve with one touch flow/cutoff in combination with a flow rate control. There is also a need for an integrated control with flow/cutoff as well as flow rate control. There is additionally a need for a flow control valve which uses a pilot-type valve to actuate the main valve. There is also a need for a one touch control which provides instantaneous shutoff or turn on of fluid flow.

SUMMARY OF THE INVENTION

These needs may be addressed by the present invention which may be embodied in a one touch valve for activating fluid flow between an inlet conduit and an outlet conduit. The valve has a flow cylinder defining an inflow chamber in fluid communication with the inlet conduit. The flow cylinder also has an outflow chamber in fluid communication with the outlet conduit. The flow cylinder includes an end plate and an intermediate plate having a center collar with an aperture. A flexible diaphragm has a sealing surface in contact with the collar to create a seal, an opposite surface, and an aperture extending therethrough. The diaphragm also has an edge coupled to the intermediate plate and a small diameter hole providing fluid communication between the inflow chamber and an intermediate chamber defined by the intermediate plate and the flow cylinder. A plunger having a contact surface and an opposite diaphragm contact surface is provided. The diaphragm contact surface creates a seal with the opposite surface of the diaphragm. A shaft having one end connected to the plunger extends through the aperture of the diaphragm. A spring is located between the end plate of the flow cylinder and the contact surface of the plunger. Pushing the shaft causes the plunger to separate from the diaphragm creating fluid pressure on the diaphragm contact surface to push the plunger toward the end plate. The spring is compressed which causes the diaphragm to separate from the collar causing fluid to flow from the inflow chamber through the aperture to the outflow chamber. Releasing the shaft causes the spring to decompress, forcing the plunger and diaphragm away from the end plate re-establishing the seal between the sealing surface with the collar preventing fluid flow from the intermediate chamber to the outflow chamber.

The invention may also be embodied in a flow control valve unit allowing a user to control the fluid flow rate and cutoff or activate fluid flow between an inlet conduit and an outlet conduit. The control valve unit has an exterior cylinder with a side wall having an outer inlet aperture in fluid communication with the inlet conduit. A flow cylinder is rotatably mounted within the side wall of the exterior cylinder. The flow cylinder defines an inflow chamber in fluid communication with the inlet conduit and an outflow chamber in fluid communication with the outlet conduit. The flow cylinder includes an inner inlet aperture which allows fluid communication to an inflow chamber, an end plate and an intermediate plate having a center collar with an aperture.

Rotating the flow cylinder changes the area of the inner inlet aperture in fluid communication to the outer inlet aperture in order to control flow rate. A flexible diaphragm has a sealing surface in contact with the collar to create a seal, an opposite surface, and an aperture extending therethrough. The diaphragm also has an edge coupled to the intermediate plate and a small diameter hole providing fluid contact between the inflow chamber and an intermediate chamber defined by the intermediate plate and the flow cylinder. A plunger has a contact surface and an opposite diaphragm contact surface. The diaphragm contact surface creates a seal with the opposite surface of the diaphragm. A shaft is provided having one end connected to the plunger and extending through the aperture of the diaphragm. A spring is located between the end plate of the flow cylinder and the contact surface of the plunger. Pushing the shaft causes the plunger to separate from the diaphragm creating fluid pressure on the diaphragm contact surface to push the plunger toward the end plate. The spring is compressed and the diaphragm separates from the collar causing fluid to flow from the inflow chamber through the aperture to the outflow chamber. Releasing the shaft causes the spring to decompress, forcing the plunger and diaphragm away from the end plate, re-establishing the seal between the sealing surface with the collar preventing fluid flow from the intermediate chamber to the outflow chamber.

The invention may further be embodied in a pistol-grip hose nozzle allowing flow control. The nozzle has a hand-grip portion connectable to a fluid source and a barrel portion having a fluid outlet. An exterior cylinder is coupled to the hand-grip portion and the barrel portion. The exterior cylinder has a side wall with an outer inlet aperture in fluid communication with the hand-grip portion. A flow cylinder is rotatably mounted within the side wall of the exterior cylinder. The flow cylinder defines an inflow chamber in fluid communication with the hand-grip portion and an outflow chamber in fluid communication with the barrel portion. The flow cylinder includes an inner inlet aperture which allows fluid communication to an inflow chamber, an end plate and an intermediate plate having a center collar with an aperture. A flexible diaphragm has a sealing surface in contact with the collar to create a seal, an opposite surface, and an aperture extending therethrough. The diaphragm has an edge coupled to the intermediate plate and a small diameter hole providing fluid contact between the inflow chamber and an intermediate chamber defined by the intermediate plate of the flow cylinder. A plunger has a contact surface and an opposite diaphragm contact surface. The diaphragm contact surface creates a seal with the opposite surface of the diaphragm. A shaft has one end connected to the plunger and extends through the aperture of the diaphragm. A spring is located between the end plate of the flow cylinder and the contact surface of the plunger. Pushing the shaft causes the plunger to separate from the diaphragm creating fluid pressure on the diaphragm contact surface to push the plunger toward the end plate and compresses the spring. This causes the diaphragm to separate from the collar causing fluid to flow from the inflow chamber through the aperture to the outflow chamber. Releasing the shaft causes the spring to decompress, forcing the plunger and diaphragm away from the end plate re-establishing the seal between the sealing surface with the collar preventing fluid flow from the intermediate chamber to the outflow chamber.

The invention may also be embodied in a valve for one touch fluid activation or cutoff and flow rate control between an inlet conduit and an outlet conduit. The valve has a valve housing having a side wall and a top member on the valve housing. A central conduit is provided in fluid communication with the inlet conduit. The central cylinder has an open top inlet with a shoulder. A flexible diaphragm is located between the valve housing and the top member. The diaphragm and valve housing define a lower chamber in fluid communication with the outlet conduit. An upper chamber is defined by the diaphragm and the valve housing. A plunger is connected to the diaphragm having a top surface and a bottom plug which forms a seal with the shoulder of the central conduit. A small hole in the plunger provides fluid communication from the central conduit through the top surface to the upper chamber. The plunger and diaphragm are capable of movement away from the shoulder of the central conduit to allow fluid flow from the central conduit to the lower chamber. A spring is located between the top surface of the plunger and the top member. A pilot chamber is provided in fluid communication with the lower chamber. A button chamber is provided in fluid communication with the upper chamber and having a hole providing fluid access to the pilot chamber. A pilot pin is provided which is movable in the button chamber between an open position allowing fluid access through the hole and a closed position plugging the hole. A flow rate control limits the distance the plunger may be moved from the shoulder of the central conduit. When the pilot pin is in the closed position, fluid pressure in the upper chamber and force from the spring move the plunger against the shoulder of the central conduit preventing fluid flow to the lower chamber. When the pilot pin is moved to the open position, fluid flows from the upper chamber through the button chamber, pilot chamber and to the lower chamber creating fluid pressure on the bottom plug of the plunger and separating the plunger from the shoulder of the central conduit creating fluid flow between the central conduit and the lower chamber.

The invention may further be embodied in a one touch water flow control unit for activating fluid flow to a water-driven device. The unit has an inlet coupler and an outlet coupler. A flow cylinder defines an inflow chamber in fluid communication with the inlet coupler and an outflow chamber in fluid communication with the outlet coupler. The flow cylinder includes an end plate and an intermediate plate having a center collar with an aperture. A flexible diaphragm is provided having a sealing surface in contact with the collar to create a seal, an opposite surface, an aperture extending therethrough and an edge coupled to the intermediate plate. The diaphragm also has a small diameter hole providing fluid contact between the inflow chamber and an intermediate chamber defined by the intermediate plate of the flow cylinder. A plunger is provided having a contact surface and an opposite diaphragm contact surface, the diaphragm contact surface creating a seal with the opposite surface of the diaphragm. A shaft having one end connected to the plunger extends through the aperture of the diaphragm. A spring is located between the end plate of the flow cylinder and the contact surface of the plunger. Pushing the shaft causes the plunger to separate from the diaphragm creating fluid pressure on the diaphragm contact surface to push the plunger toward the end plate, compressing the spring, and causing the diaphragm to separate from the collar allowing fluid to flow from the inflow chamber through the aperture to the outflow chamber. Releasing the shaft causes the spring to decompress, forcing the plunger and diaphragm away from the end plate re-establishing the seal between the sealing surface with the collar preventing fluid flow from the intermediate chamber to the outflow chamber.

It is to be understood that both the foregoing general description and the following detailed description are not limiting but are intended to provide further explanation of the invention claimed. The accompanying drawings, which are incorporated in and constitute part of this specification, are included to illustrate and provide a further understanding of the method and system of the invention. Together with the description, the drawings serve to explain the principles of the invention.

BRIEF DESCRIPTION OF DRAWINGS

FIG. 15 is a side cutaway view of another flow control unit with a one touch flow valve and a separate flow control unit;

FIG. 16 is a side cutaway view of another flow control unit with a dial flow control and simultaneous actuation of water flow;

FIG. 17 is a top cutaway view along the line 17–17' of the flow control unit of FIG. 16;

DESCRIPTION OF THE PREFERRED EMBODIMENT

Figure 1:
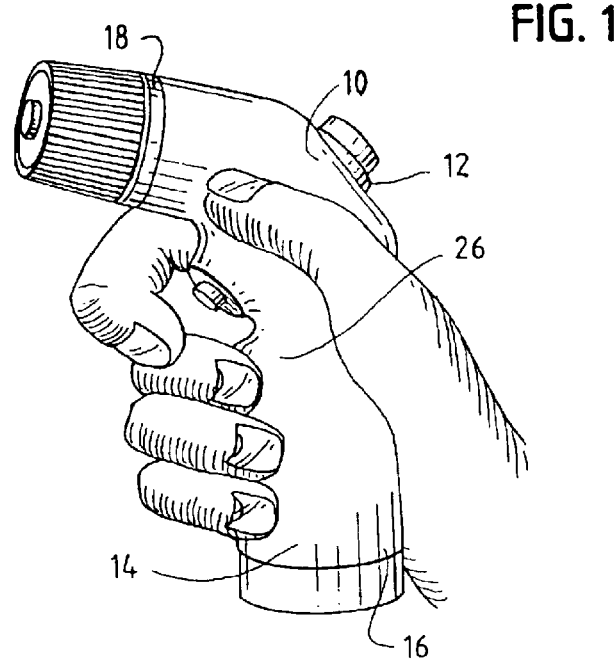
FIG. 1 is a perspective view of a hose nozzle using a one touch control valve according to one embodiment of the present invention.

While the present invention is capable of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

Figure 2:
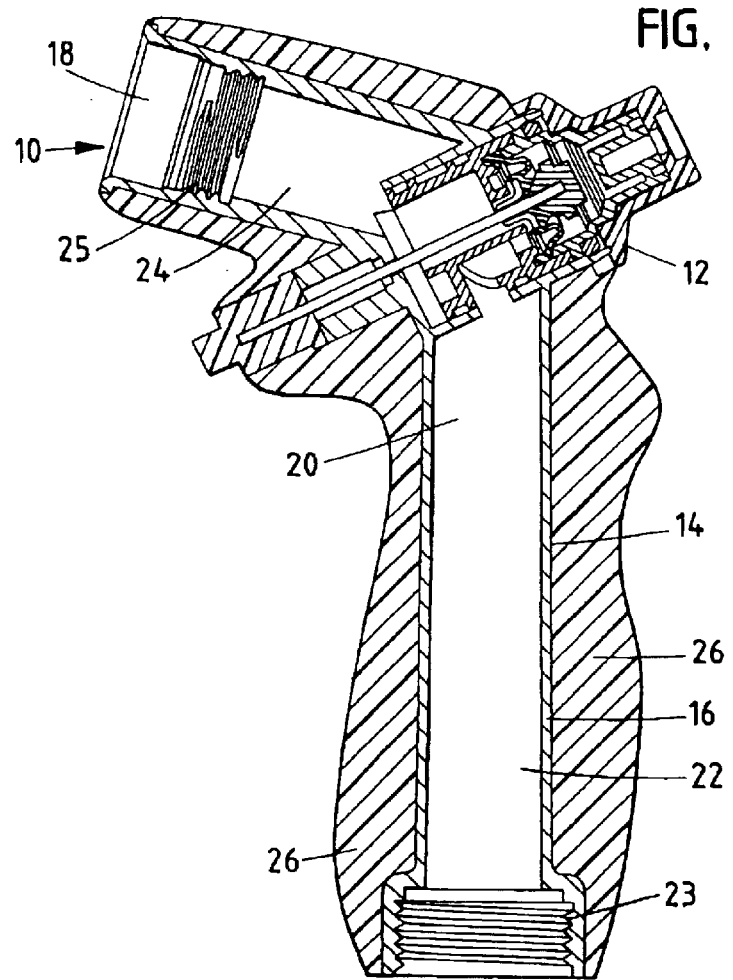
FIG. 2 is a cutaway view of the hose nozzle of FIG. 1.

Referring now more particularly to FIGS. 1–2 of the drawings, there is shown therein a pistol-grip hose nozzle, generally indicated at 10, incorporating a one touch fluid flow valve 12 which is an embodiment of the present invention. As shown, the hose nozzle 10 includes a fixed body structure 14 including a hand-grip portion 16 and a barrel portion 18 extending at an angle from the hand-grip portion 16. The body structure 14 defines an interior fluid passage, generally indicated at 20, including an inlet passage portion 22 extending through the hand-grip portion 16 and an outlet passage portion 24 extending from the inlet passage portion 22 through the barrel portion 18. The inlet passage portion 22 has an inlet end formed with interior threads 23 which constitute a female coupling or fitting for inter-engaging with a conventional male hose fining (not shown) for purposes of communicating a supply of fluid under pressure with the inlet passage 22. Of course other types of connections may be used such as a quick connect to connect a hose to the hose nozzle 10.

The forward end of the outlet passage portion 24 has a threaded interior surface 25 which also serves as a female coupling or fitting for different types of spray heads. Such heads may include a single pattern nozzle, a rotational sleeve on a stem for a sharp to conical stream (shown) or a multi-pattern head. Of course, other connectors such as a male coupling may be used on the outlet message 24 to attach spray heads. The fixed body structure 14 is preferably a casting of zinc although other materials such as brass or plastic may be used. An elastomeric resilient covering 26 is placed over the fixed body structure to provide shock protection for the fixed body structure and the valve unit 12. The resilient covering 26 also provides a contact surface for a user and insulates the user from temperature extremes. The part of the covering 26 over the hand-grip portion 16 may be textured for a better grip.

Figure 3:
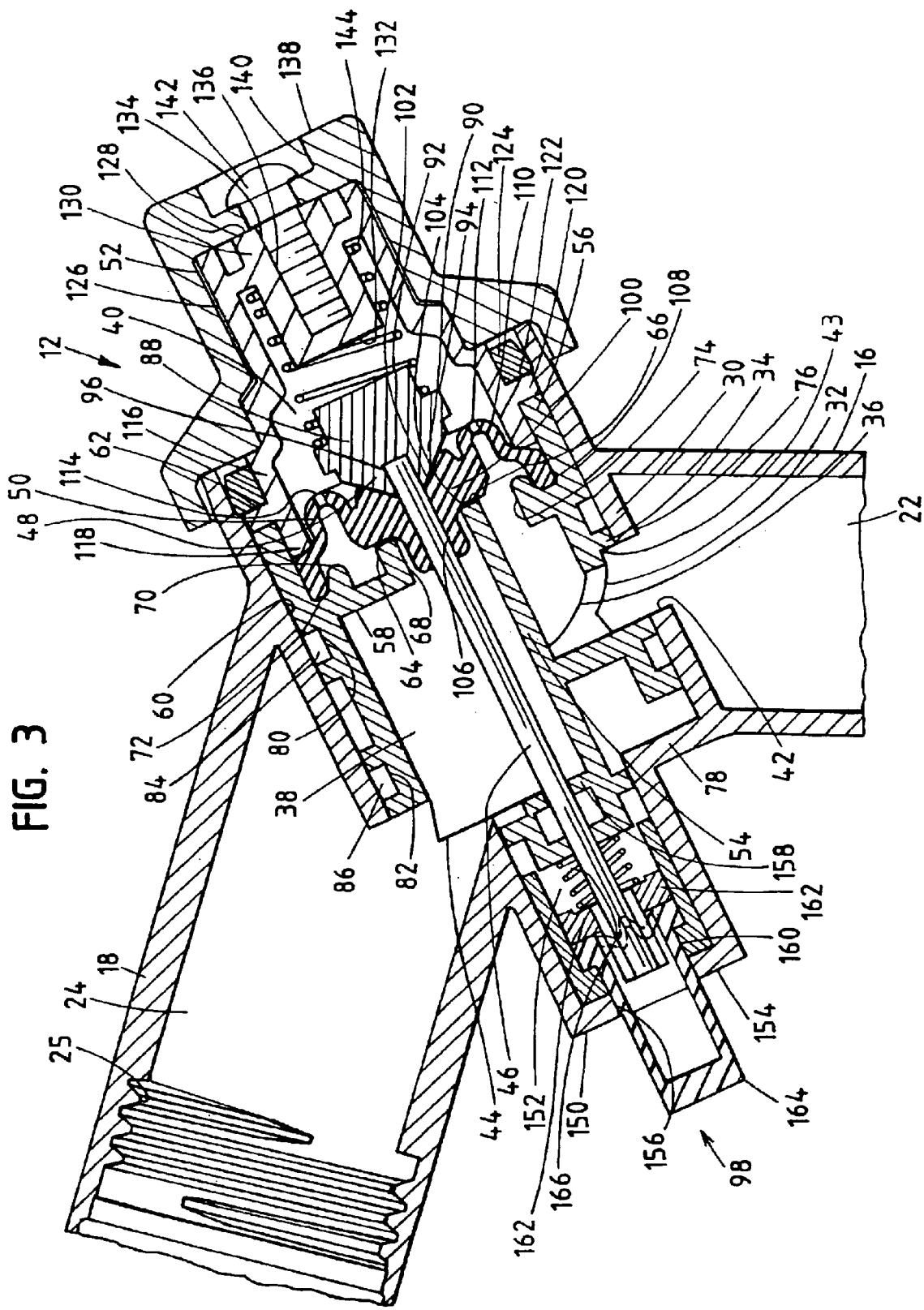
FIG. 3 is a cutaway closeup view of the one touch valve of FIG. 1.

The valve unit 12 is interposed in the flow passage 20 between the inlet flow passage 22 and the outlet passage 24 in order to control the fluid flow from the inlet flow passage 22 to the outlet passage 24. FIG. 3 shows a close up of the valve unit 12. An exterior cylindrical wall 30 is formed between the inlet passage 22 and the outlet passage 24. The exterior cylindrical wall 30 has a valve chamber 32 which allows the mounting of a rotatable flow cylinder 34. The flow cylinder 34 divides the valve chamber 32 into an inflow chamber 36 in fluid communication with the inlet passage 22 and an outflow chamber 38 which is in fluid communication with the outlet passage 24. An intermediate chamber 40 is provided between the inflow chamber 36 and the outflow chamber 38. The cylindrical wall 30 has an outer inlet aperture 42 and the rotatable flow cylinder 34 has an inner inlet aperture 43 which preferably has the same cross-sectional shape as the outer inlet aperture 42. The inlet apertures 42 and 43 allow fluid to flow to the inflow chamber 36. The bottom of the flow cylinder 34 has an outlet 44 allowing fluid to flow to the outlet passage 24. The flow cylinder 34 is preferably molded of plastic.

The valve unit 12 has a shaft 46, a plunger 48, a diaphragm 50 and a flow control adaptor 52. The flow cylinder 34 has a dividing wall 54 which isolates the inflow chamber 36 from the outflow chamber 38. The flow cylinder 34 has a cap member 56 which has a circular bottom 58 and a side wall 60. The top of the side wall 60 forms a circular shoulder 62 which provides support for the flow control adaptor 52. The center of the circular bottom 58 has a collar 64 which has a shoulder 66 for the seating of the diaphragm 50. The collar 64 also has a center aperture 68 which provides fluid access between the outflow chamber 38 and the diaphragm 50. The bottom 58 also has an annular ridge 70 which along with the side wall 60 forms an annular groove 72 to seat the diaphragm 50. The bottom 58 has a fluid flow aperture 74 formed between the collar 64 and the annular ridge 70 to provide fluid access from the inflow chamber 36.

The inflow chamber 36 is bounded by the dividing wall 54, a cylindrical lower wall 76 and a bottom plate 78. The lower wall 76 has an upper annular groove 80 and a lower annular groove 82. An O-ring 84 is installed in the upper annular groove 80 and an O-ring 86 is installed in the lower annular groove 82. The O-rings 84 and 86 provide a fluid tight seal between the flow cylinder 34 and the exterior cylindrical wall 30.

The plunger 48 has cylindrical body 88 with a conical bottom 90 and a flat top surface 92. An annular shoulder 94 is formed just below the top surface 92. The conical bottom 90 has a hole 96 into which one end of the shaft 46 is inserted. The opposite end of the shaft 46 is connected to a push button actuator 98. The plunger 46 is seated on the diaphragm 50 via the conical bottom 90. The diaphragm 50 is molded of a flexible material which is preferably rubber or a thermal plastic elastomer. The diaphragm 50 has a center plug 100 which forms a conical center socket 102 and an opposite sealing surface 104. The conical bottom 90 of the plunger 48 conforms to the conical center socket 102. The sealing surface 104 rests on the shoulder 66 of the flow cylinder 34. The center plug 98 has an aperture 106 through which the shaft 46 is inserted. The diaphragm 50 has a side flap 108 and a radial nub 110. The nub 110 is located radially between the side flap 108 and the center plug 100. A relatively small diameter hole 112 is located in the nub 108 which allows fluid flow from the inflow chamber 36 to the intermediate chamber 40. A relatively small diameter hole 114 is located in the nub 108 diametrically across from the small hole 112. The small hole 114 also allows fluid flow from the inflow chamber 36 to the intermediate chamber 40.

The flow control adaptor 52 has a bottom cylinder 116 which has a bottom rim 118. The bottom rim 118 locks the side flap 108 of the diaphragm 50 in the annular groove 72 of the flow cylinder 34. The bottom rim 118 also is coupled to the side wall 60 of the flow cylinder 34. The bottom cylinder 116 has an annular ridge 120 which forms a shoulder 122. A washer 124 is seated on the shoulder 122 to provide a retainer for the flow control adaptor 52. The flow control adaptor 52 also has an upper cylinder 126 with a top end 128. A cylindrical body 130 is suspended under the top end 128. The cylindrical body 130 has a contact surface 132. The cylindrical body 130 also has a hole 134 with interior threads 136. A knob 138 is inserted over the upper cylinder 126 of the flow control adaptor 52. The knob 138 has a recess 140 which accommodates the head of a screw 142 which attaches the knob 138 to the body 130 via the hole 134. Of course other fasteners such as a bolt or a self tap screw may be used to attach the knob 138. A spring 144 is located around the body 130 and is seated on the annular shoulder 94 of the plunger 48.

The push button actuator 98 is installed within a button chamber 150 which is connected to the bottom of the exterior cylindrical wall 30. The button chamber 150 has a cylindrical inner compartment 152 which is bounded by the bottom plate 78 of the flow cylinder 34 and a button surface 154 with a circular hole 156 therethrough. The shaft 46 is inserted through a hole 158 in the bottom plate 78. The push button actuator 98 has a cap 160 which contacts the end of the shaft 46.

The cap 160 has a series of radial tabs 162 which each interlock with a pattern of deep slots, angled ridges and shallow slots on the surface of the inner compartment 152. The cap 160 thus may be rotated in the chamber 150 between the bottom plate 78 and the button surface 154. A button cover 164 is attached to the cap 160 and extends out of the circular bole 156. A spring 166 is provided between the interior of the button cover 164 and the cap 160 in order to bias the button cover 164 in an outward position as shown in FIG. 3. Pushing the button cover 164 causes the cap 160 to be rotated on the ridges and the tabs 162 to be seated in the deep slots on the ridges on the inner compartment 152. This locks the cap 160 into an inward position against the bottom plate 78. Pushing the button cover 164 again causes the tabs 162 of the cap 160 to be removed from the deep slots, where they contact a ridge, rotating the cap 160, until the tabs 162 are seated in the shallow slots. This unlocks the cap 160 and allows its movement to the outward position.

The flow control adaptor 52 and the flow control cylinder 34 allows a user to regulate the flow rate from the inlet passage 22 to the outlet passage 24. A user adjusts the flow rate by rotating the knob 138 and thus rotating the attached flow control adaptor 52 and flow control cylinder 34. When the knob 138 is rotated, the inner inlet aperture 43 is rotated in relation to the outer inlet aperture 42. The flow rate of the valve unit 12 is thus proportional to the amount of cross-sectional area of the outer inlet aperture 43 which is exposed to the inner inlet aperture 42. This area may be adjusted by rotating the flow control cylinder 34 via the knob 138.

Figure 4A:
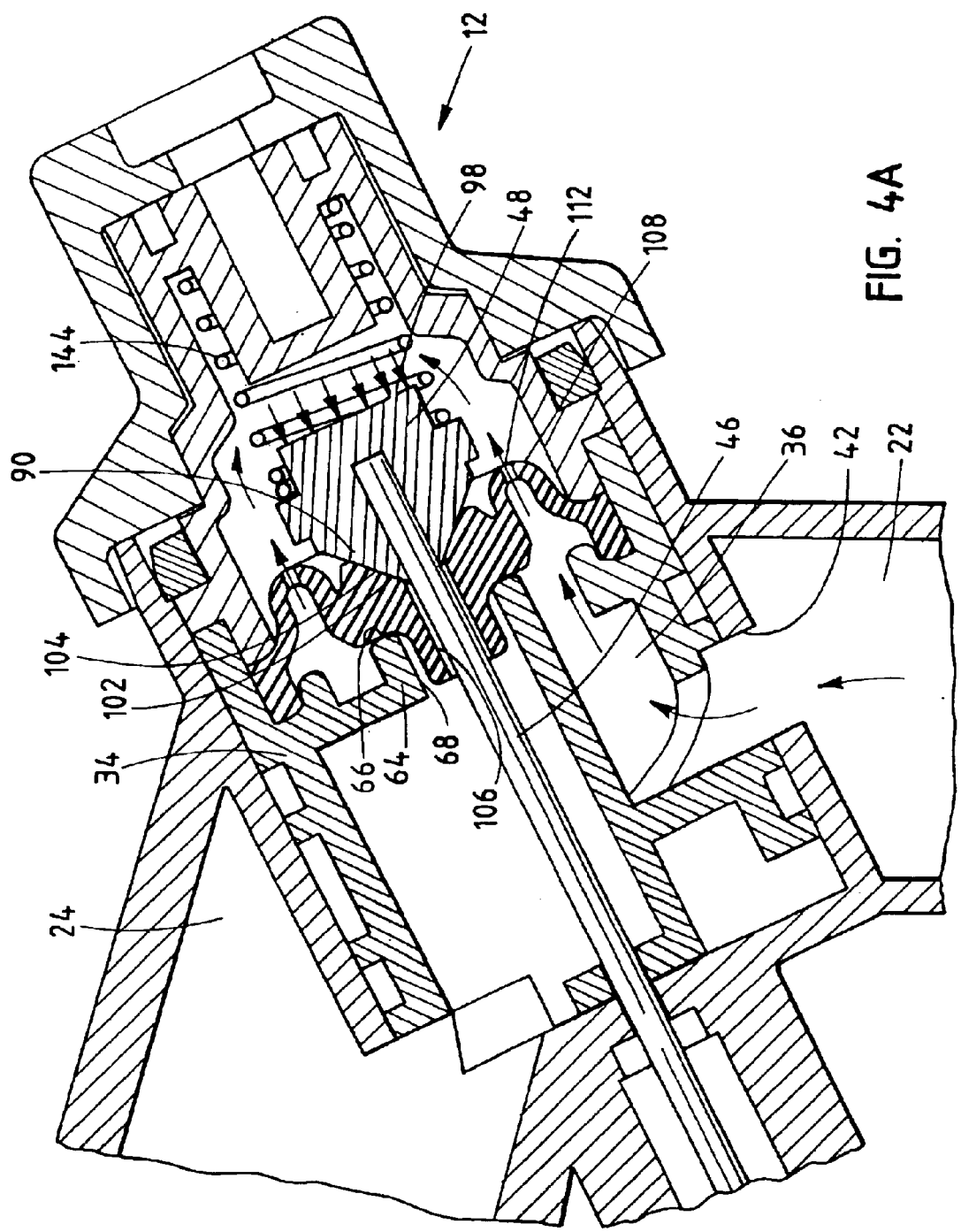
FIGS. 4A–4D are cutaway closeup views of the one touch valve in FIG. 1 in various stages of opening and closing.

The operation of the one touch valve will be explained with reference to FIGS. 4A–4D which show the various positions of the valve unit 12. FIG. 4A shows the valve unit 12 in a closed position preventing fluid flow to the outlet passage 24. Fluid enters the inflow chamber 36 via the inlet aperture 42. The fluid flows through the small holes 112 and 114 in the nub 108 of the diaphragm 50 into the intermediate chamber 40. The fluid pressure pushes the flat top surface 92 of the plunger 48. This forces the conical bottom 90 of the plunger 48 against the conical center socket 102 of the diaphragm 50 forming a seal to prevent any fluid flow through the aperture 106. The fluid pressure also causes the opposite sealing surface 104 of the diaphragm to form a seal against the shoulder 66 of the flow control cylinder 34. This seal prevents fluid flow through the center aperture 68 in the collar 64. The fluid pressure pushing the plunger 48 against the diaphragm 50 is assisted by light pressure applied by the spring 144.

Figure 4B:
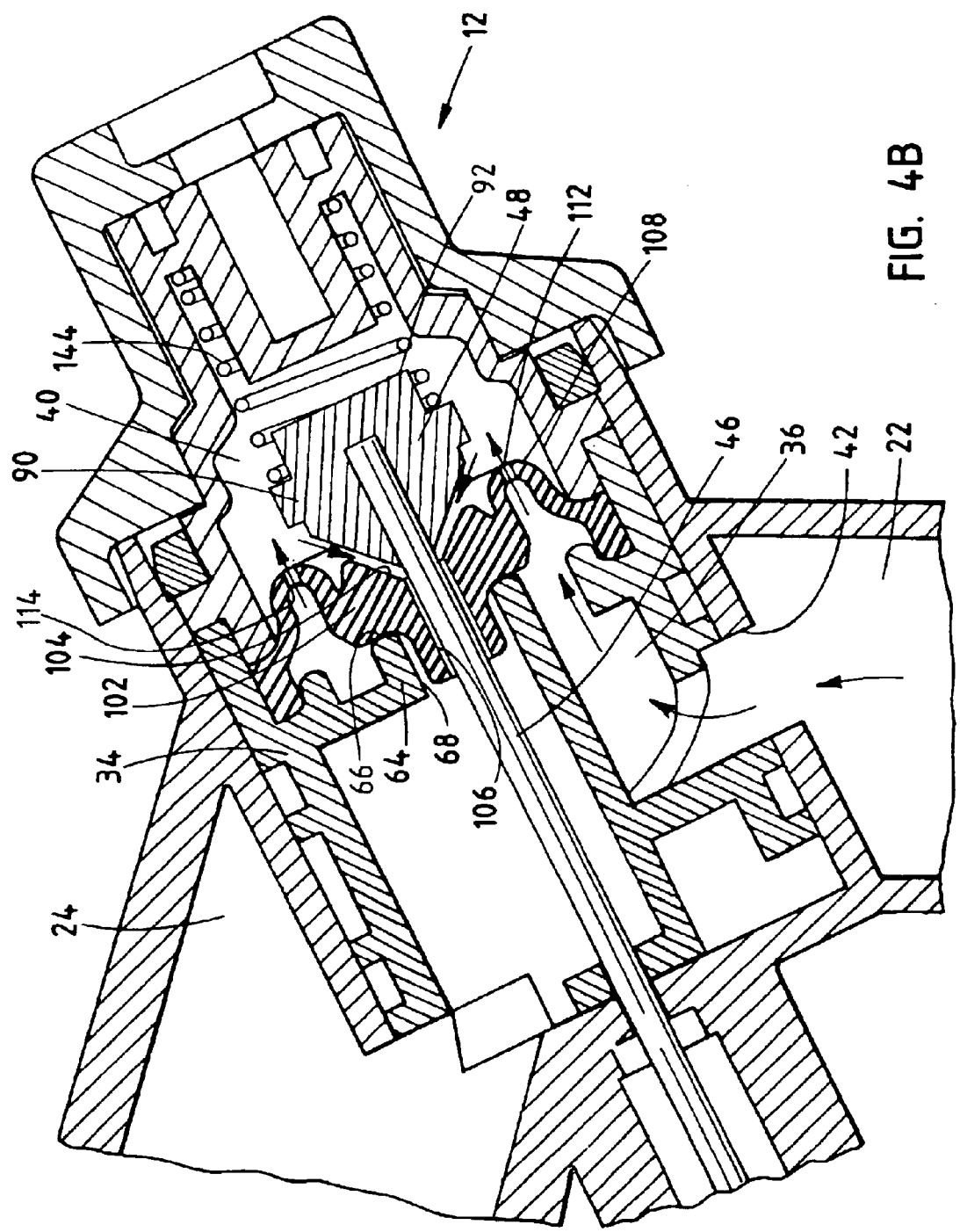

In order to open the valve, a user depresses the button cover 164 and therefore rotates cap 160 so the tabs 162 catch the deep slots on the ridges of the inner surface as shown in FIG. 3 and thus locks the cap 160 against the bottom plate 78. As shown in FIG. 4B, this causes the shaft 46 to push the plunger 48 away from the diaphragm 50. The movement of the plunger 48 away from the diaphragm 50 causes a passage to open between the conical bottom 90 of the plunger 48 and the conical center socket 102 of the diaphragm 50. The fluid flows from the intermediate chamber 40 between the conical bottom 90 and the conical center socket 102 through the aperture 106 into the outflow chamber 38. Fluid still flows from the inflow chamber 36 through the small holes 112 and 114 to the intermediate chamber 40, but the intermediate chamber 40 is drained faster by the flow out through the aperture 106 due to the relatively small size of the holes 112 and 114. Thus, the fluid flowing between the conical bottom 90 and the conical center socket 102 creates greater pressure at the bottom of the diaphragm 50 and is sufficient to overcome the combined force from the fluid pressure on the top surface 92 and the spring 144. The diaphragm 50 is thus deformed to move upward, causing the scaling surface 104 to separate from the shoulder 66 of the flow control cylinder 34. The separation of the sealing surface 104 and the shoulder 66 creates direct fluid flow between the inflow chamber 36 and the outflow chamber 38. The fluid now flows from the inflow chamber 36, between the sealing surface 104 and the shoulder 66, through the center aperture 68 and into the outflow chamber 38. The additional fluid pressure forces the diaphragm 50 upward creating contact between the conical bottom 90 of the plunger 48 and the center socket 102 of the diaphragm 50. This creates a seal preventing fluid from flowing out of the aperture 106.

Figure 4C:
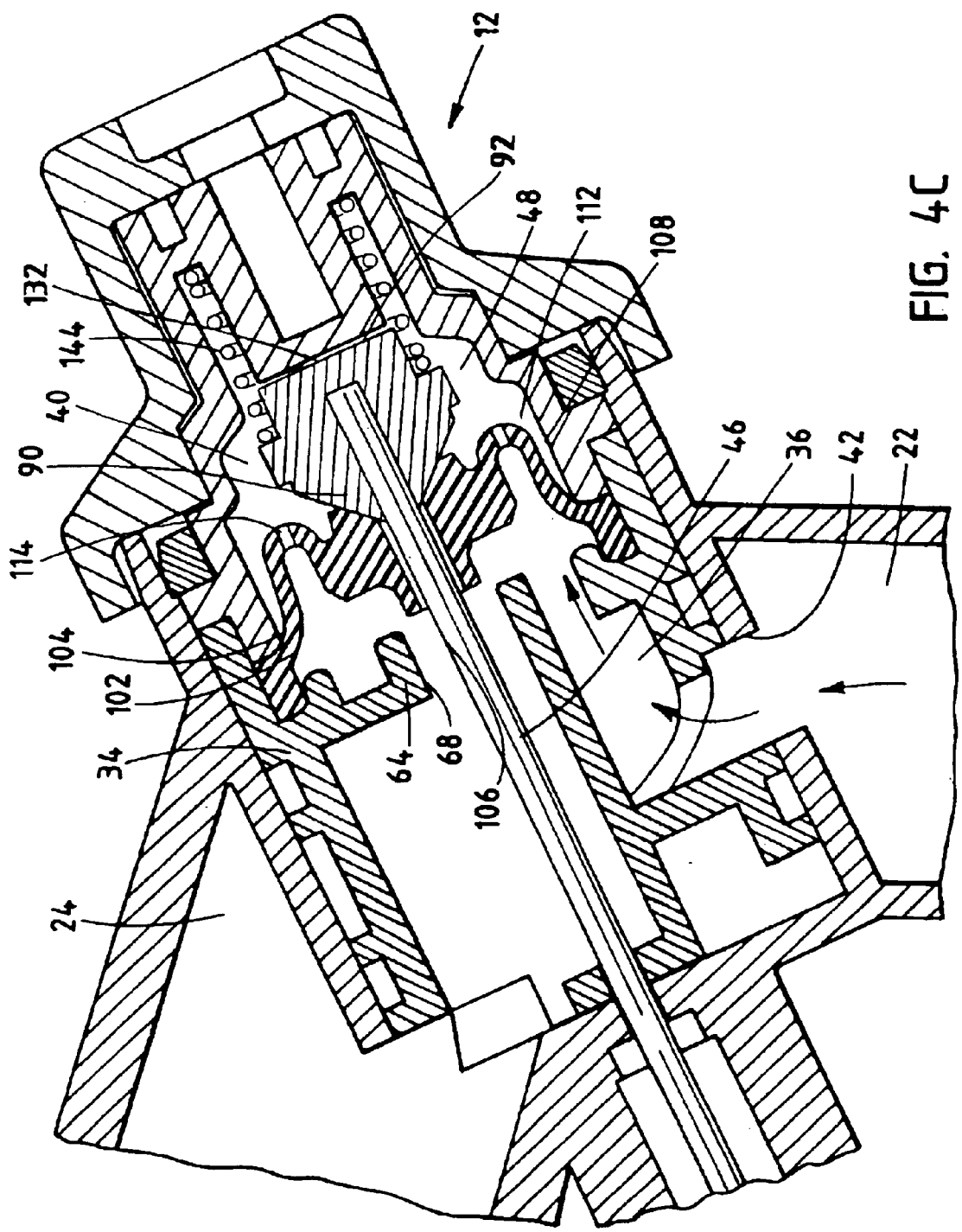

The resulting open position of the valve unit 12 is shown in FIG. 4C. The top surface 92 of the plunger 48 is pushed against the contact surface 132 of the flow control adaptor 52 by the shaft 46 and the button cap 160 (not shown in FIG. 4C). The pressure created by the fluid flow through the passage created by the separation of the sealing surface 104 and the shoulder 66 of the collar 64 serves to deform the diaphragm 50 and push the plunger 48 against the contact surface 132. The fluid pressure pushing down on the diaphragm 50 is negligible since the fluid flowing into the intermediate chamber 40 is minimized due to the small diameter of the holes 112 and 114. The spring force from the spring 144 is insufficient to overcome the upward force of the shaft 46 and that generated by the fluid flowing from the inflow chamber 36 to the outflow chamber 38 through the center aperture 68.

Figure 4D:
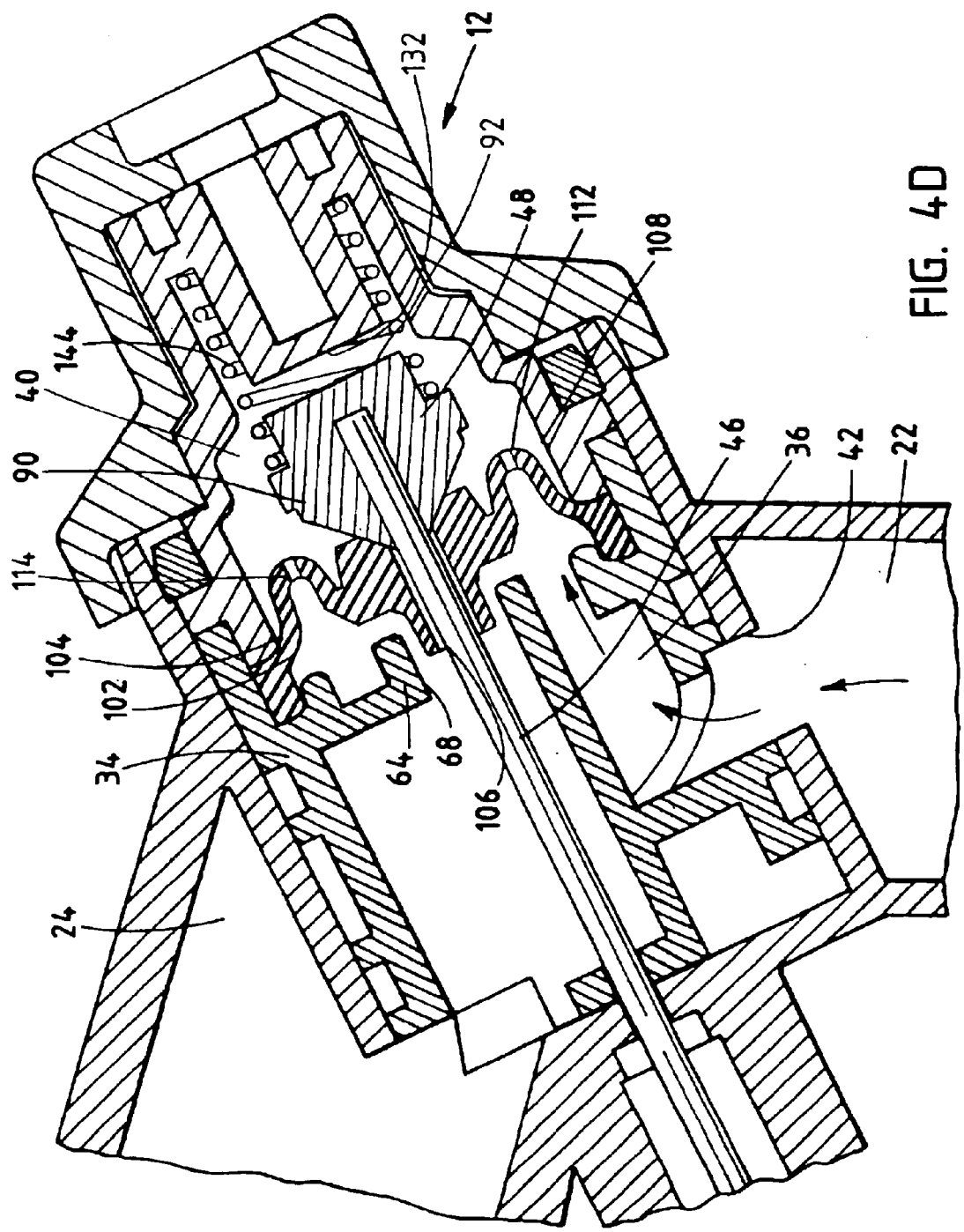

In order to open the valve unit 12, a user will push the button cover 164 which rotates the cap 160 and moves the tabs 162 into the shallow slots of the ridges of the inner compartment 152. This causes the cap 160 to move to an outward position. The shaft 46 and cap 160 thus no longer hold the plunger 48 against the contact surface 132. The force of the compressed spring 144 then pushes the plunger 48 away from the contact surface 132 as shown in FIG. 4D. This creates fluid flow into the intermediate chamber 40 and between the contact surface 132 and the top 92 of the plunger 48. The fluid flow creates pressure which pushes both the plunger 48 and the diaphragm 50 down shutting the fluid flow between the inflow chamber 36 and the outflow chamber 38 through the aperture 68.

The use of fluid pressure and the locking button cap 160 relieves a user from the need to hold down the button actuator 98 in order to keep the valve unit 12 open. The relatively low force exerted by the spring 144 makes the pressure required on the button actuator 98 to be low in order to either open or close the valve unit 12. Additionally, the actuation of the valve is nearly instantaneous causing either complete fluid flow or cutoff rapidly.

Figure 5:
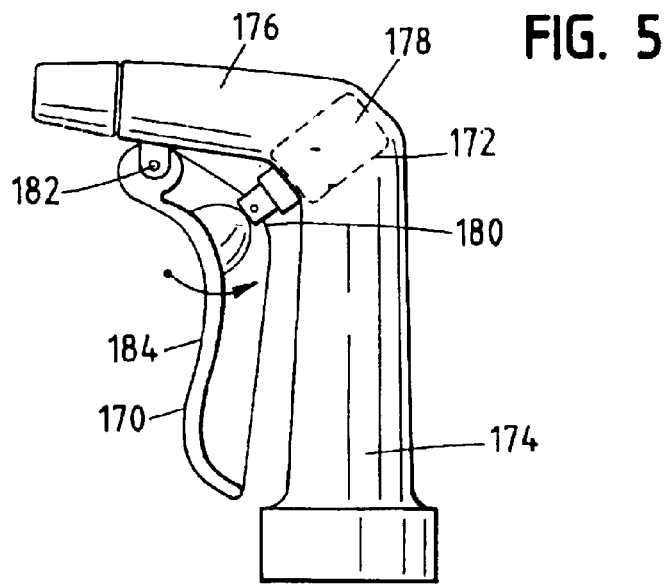
FIG. 5 is a side view of the use of a trigger to activate the one touch control valve in FIG. 1.

It is to be understood that the shaft 46 may be actuated by other mechanical devices. FIG. 5 shows a trigger 170 which is used in conjunction with a hose nozzle 172. The hose nozzle 172 has an inlet 174 and an outlet 176. A one touch valve 178 similar to the valve unit 12 regulates water flow and cutoff between the inlet 174 and the outlet 176. A push button 180 activates the flow and cuts off the fluid flow in a manner identical to the cap 160 and button cover 164 in FIGS. 1–4. The trigger 170 rotates on a pivot 182 and has a hand-grip 184. When a user squeezes and releases the trigger 170, the button 180 is depressed thus either activating or cutting off fluid flow through the outlet 176 of the hose nozzle 172. Squeezing and releasing the trigger 170 again cuts off or activates fluid flow.

Figure 6:
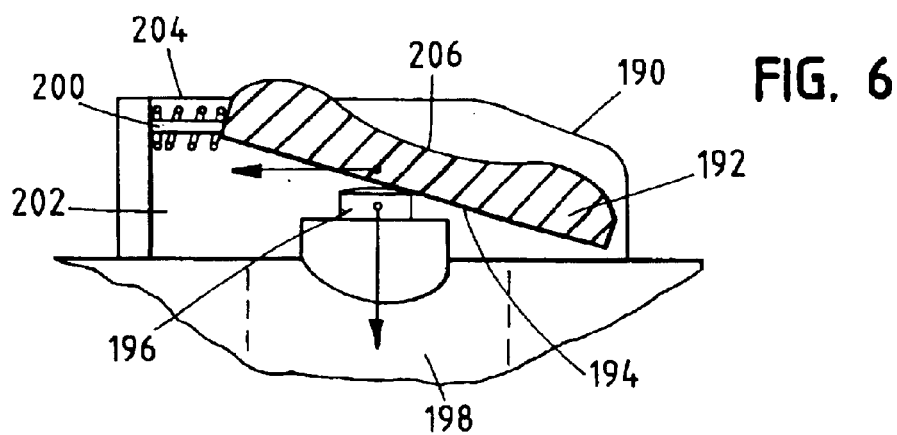
FIG. 6 is a side view of the use of a slide control to activate the one touch control valve in FIG. 1.

FIG. 6 shows a slide switch 190 which has a thumb tab 192. The thumb tab 192 has an inclined plane surface 194 which is in contact with a button 196. The button 196 activates the flow and cuts off the fluid flow on a one touch valve unit 198 in a manner identical to the cap 160 and button cover 164 in relation to the valve unit 12 in FIGS. 1–4. The slide switch 190 moves on a track 200 which is formed on a side wall 202. The slide switch 190 and is biased in a backward position by a spring 204. The slide switch 190 may be moved in a forward position by a user's finger or thumb on an indented surface 206 which causes the inclined plane 194 to move forward, depressing the button 196 thus either activating or cutting off fluid flow. In order to cut off or activate the fluid flow, the switch 190 is merely moved forward again to depress the button 196 again. It is to be understood that with appropriate modifications, moving the switch 190 backward may activate the button 196.

Figure 7:
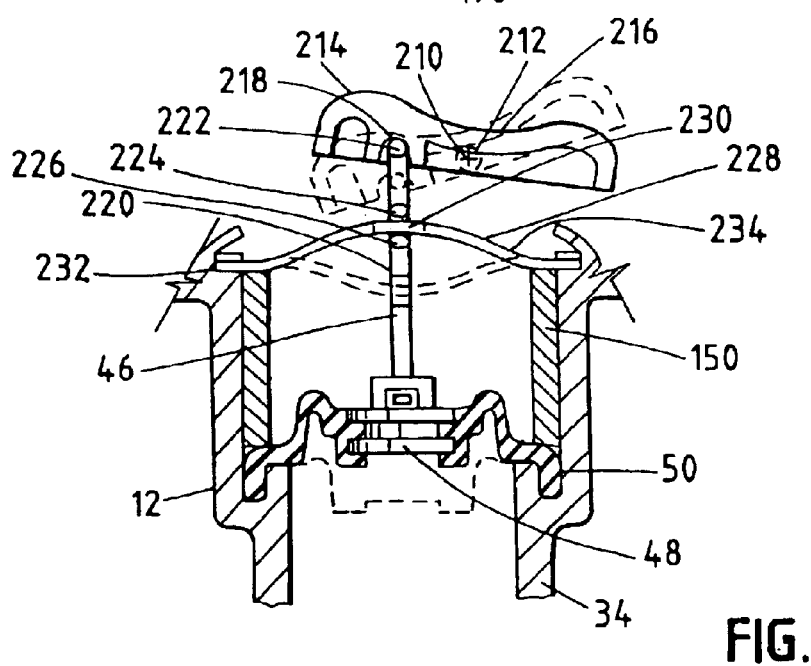
FIG. 7 is a cutaway side view of a rocker switch control to activate the one touch control valve in FIG. 1.

FIG. 7 shows the use of a rocker switch 210 with the valve unit 12 in FIGS. 1–4. In FIG. 7, like numbers represent like elements to those in FIGS. 1–4. The rocker switch 210 may be articulated on a pivot point 212. The rocker switch 210 has a contact surface 214 with an indentation 216 which conforms to a user's finger. A lateral groove 218 is formed underneath the contact surface 214. One end of the rocker switch 210 is attached to a keyed shaft 220. The keyed shaft 220 has a lateral pin 222 which is locked into the groove 218 of the rocker switch 210. The other end of the shaft 220 extends to the shaft 46 which is in turn connected to the plunger 48 and activates the diaphragm 50.

The shaft 220 has a pair of intermediate pins 224 and 226 which are coupled to a metal spring strip 228 via a slot 230. The shaft 220 is installed by inserting the pin 224 through the slot 230 and turning the shaft 220 to orient the lateral pin 222 to the groove 218 and thus holding the spring 228 between the pins 224 and 226. The spring 228 has opposite ends 232 and 234 which are mounted on opposite ends of the button chamber 150 causing compression of the spring 228. The spring 228 is normally biased to keep the shaft 220 in an up position.

When the rocker switch 210 is depressed on the pivot point 212, the shaft 220 is depressed thus either activating or cutting off fluid flow through the valve unit 12. This action compresses the spring 228. When pressure applied by pivoting the rocker switch 210, the spring force from the spring 228 pops the shaft 220 into its original position.

Figure 8:
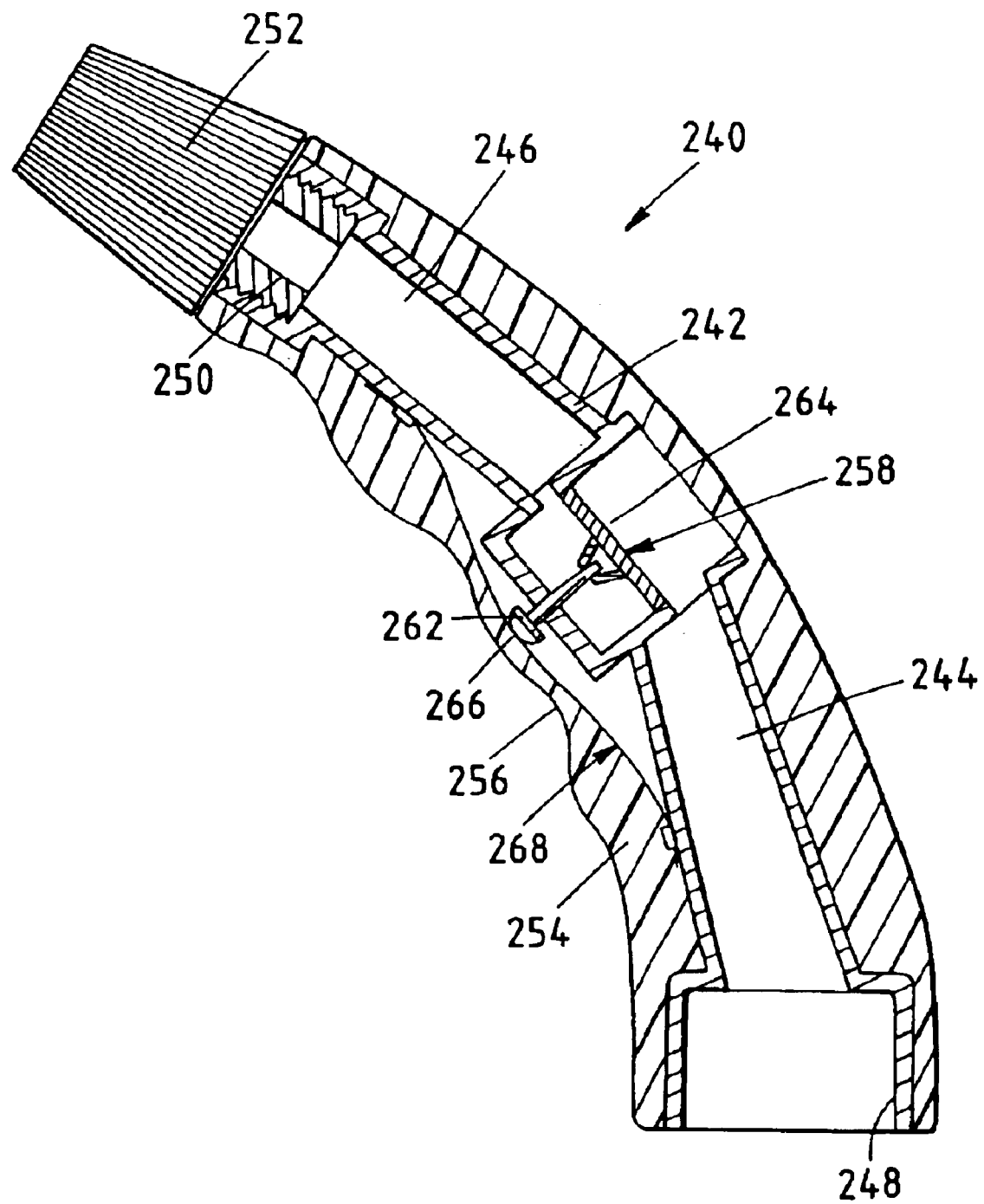
FIG. 8 a cutaway side view of a hose nozzle using a squeeze control to activate a one touch control valve similar to that in FIG. 1.

FIG. 8 shows a hose nozzle 240 with a main body 242. The main body 242 forms an inlet passage 244 and an outlet passage 246. The inlet passage 244 has a connector 248 which in this example is a female threaded socket for a hose. The outlet passage 246 has a connector 250 which in this example is a female threaded socket attached to an adjustable spray head 252 which when rotated allows variation of the flow from nozzle 240 from a fine spray to a direct stream. The main body 242 has an elastomeric molded outer covering 254 which serves as insulation as well as forms a series of hand-grips 256 for the user's hand.

The water flow from the inlet passage 244 to the outlet passage is controlled by a valve unit 258 which is similar to the valve unit 12 in FIGS. 1–4. The valve unit 258 has a stem 260 which is coupled to a push-push unit 262 similar to the cap 160 and cover 164 of FIGS. 1–4. The stem 260 moves a diaphragm 264 to operate the valve unit 258. The push-push unit 262 has a button 266 which is in close proximity to a strip spring 268 which may be deformed to contact the button 266. The valve unit 258 is activated by a user squeezing the finger grips 256 of the elastic cover 254 which pushes the strip spring 268 into contact with the button 266 to turn the valve unit 258 on or off. Of course, the switching devices shown in FIGS. 5–8 are merely illustrative; it is to be understood that other switching mechanisms may be used to activate the one touch valve unit 12 in FIGS. 1–4.

Figure 9:
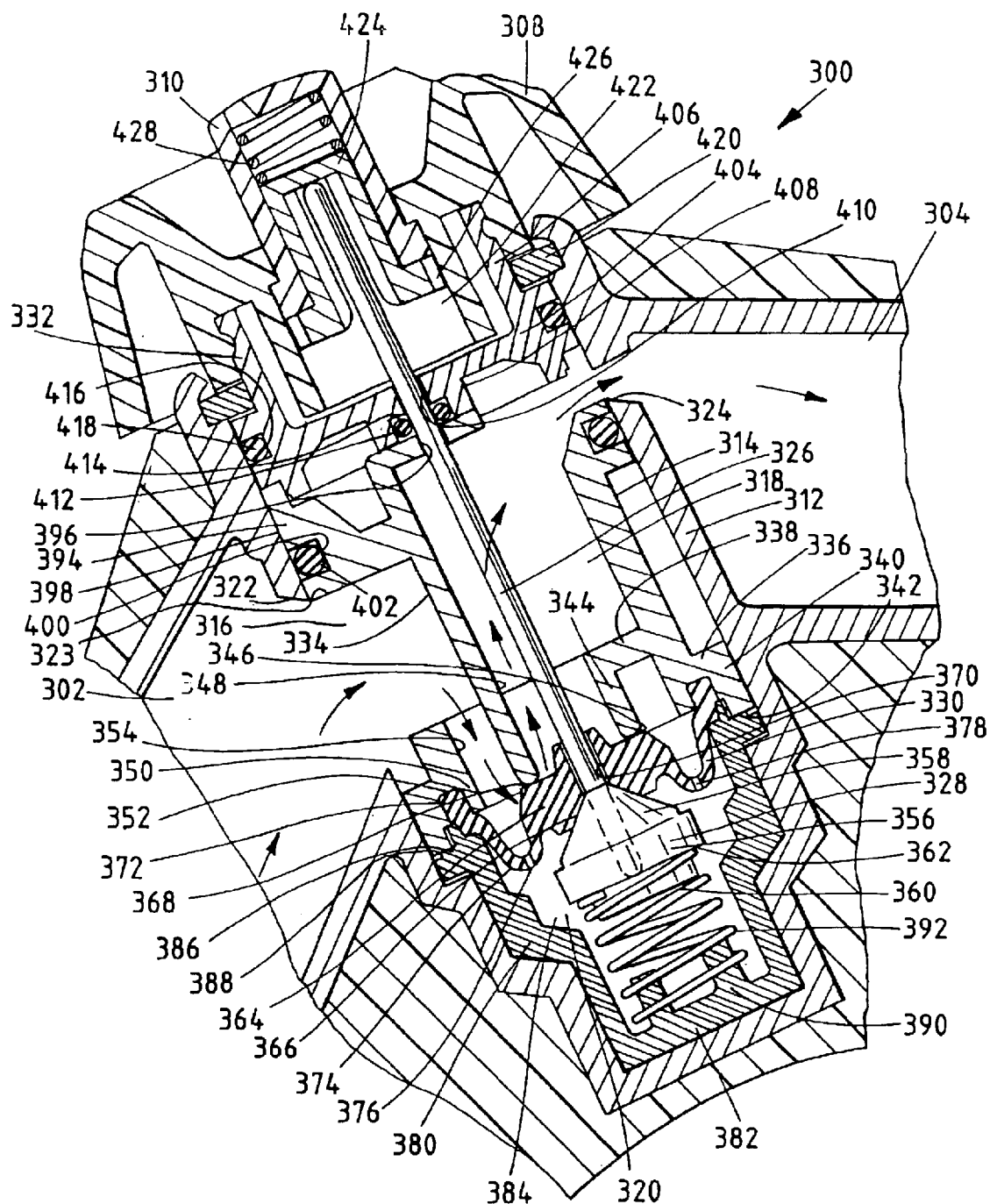
FIG. 9 is a cutaway perspective view of a one touch valve integrated with a flow control knob.

FIG. 9 shows an alternative configuration of a combination flow control and one touch flow valve 300. As in FIGS. 1–3, the valve 300 allows fluid flow from an inlet member 302 to an outlet member 304. A user may control the flow rate via a flow control knob 308 which functions similarly to the flow control knob 138 in FIGS. 1–3. The center of the flow control knob 308 has a cutoff/flow button 310 which allows one touch flow and flow cutoff between the inlet member 302 and the outlet member 304.

A housing 312 is formed between the inlet member 302 and the outlet member 304. The housing 312 has a flow control cylinder 314 which divides the housing 312 into an inflow chamber 316 in fluid contact with the inlet member 302 and an outflow chamber 318 in fluid contact with the outlet member 304. An intermediate chamber 320 is provided between the inflow chamber 316 and the outflow chamber 318. The housing 312 has an outer inlet aperture 322 which allows fluid to flow to the inflow chamber 316. The opposite side of the housing 312 has an outlet 324 allowing fluid to flow to the outlet member 304. The flow control cylinder 314 has an inner inlet aperture 323 which is preferably the same size and shape as the outer inlet aperture 322.

The valve 300 further includes a shaft 326 which has one end in contact with the cutoff/flow button 310. The other end of the shaft 326 is connected to a plunger 328. The plunger 328 is in contact with a diaphragm 330. A flow control socket 332 is attached to the flow control knob 308. The flow control cylinder 314 has a dividing wall 334 which isolates the inflow chamber 316 from the outflow chamber 318. The flow control cylinder 314 has a cup member 336 which has a circular plate 338 and a side wall 340. The top of the side wall 340 forms a circular shoulder 342. The center of the circular plate 338 has a collar 344 which has a shoulder 346 for the seating of the diaphragm 330. The collar 344 also has a center aperture 348 which provides fluid access between the outflow chamber 318 and the diaphragm 330. The circular plate 338 also has an annular ridge 350 which along with the side wall 340 forms an annular groove 352 to seat the diaphragm 330. The circular plate 338 also has a fluid flow aperture 354 formed between the collar 344 and the annular ridge 350 to provide fluid access from the inflow chamber 316.

The plunger 328 has a cylindrical body 356 with a conical bottom 358 and an opposite flat surface 360. An annular shoulder 362 is formed just below the flat surface 360. The shaft 326 is inserted in the conical bottom 358. The diaphragm 330 has a center plug 364 which forms a conical center socket 366 and an opposite sealing surface 368. The conical bottom 358 of the plunger 328 conforms to the conical center socket 366 of the diaphragm 330. The sealing surface 368 rests on the shoulder 346 of the flow control cylinder 314. The center plug 364 has an aperture 370 through which the shaft 326 is inserted.

The diaphragm 330 is made of a flexible material which is preferably rubber or an elastomeric polymer and has a side flap 372 and a radial nub 374. The nub 374 is located between the side flap 372 and the center plug 364. Two relatively small diameter holes 376 and 378 are located diametrically opposite each other on the nub 374 to which allow fluid flow from the inflow chamber 316 to the intermediate chamber 320.

A cap member 380 is roughly cylindrical with a closed end 382 and an open end 384 bounded by a rim 386. The rim 386 forms a shoulder 388 which mates with the shoulder 342 of the flow control cylinder 314. The side flap 372 of the diaphragm 330 is inserted in the annular groove 352 and is held in place by the rim 386 of the cap member 380. The cap member 380 also has a spring holder 390 suspended from the closed end 382. A spring 392 is seated on the shoulder 362 of the plunger 328.

The flow control cylinder 314 has a cylindrical cap 394 which has a center hole 396 through which the shaft 326 is inserted. The cap 394 has an exterior surface 398 with an annular groove 400. An O-ring 402 is installed in the annular groove 400 to provide a fluid tight seal between the flow control cylinder 314 and the housing 312.

The flow control socket 332 is formed with a bottom plate 404 and a side wall 406. The opposite side of the bottom plate 404 has a collar 408 with a center hole 410 through which the shaft 326 is inserted. The collar 408 and the hole 410 form an annular groove 412 which has an O-ring 414 to provide a seal against the shaft 326. The side wall 406 has an exterior groove 416 which holds an O-ring 418 to provide a fluid tight seal between the flow control socket 332 and the housing 302. The collar 408 and the side wall 406 of bottom plate 404 rests on the cylindrical cap 394 of the flow control cylinder 314. A washer 420 is installed around the side wall 406 to lock the flow control socket 332 in place.

The flow control knob 308 is inserted over the side wall 406 of the flow control socket 332. The push button 310 is installed within a button chamber 422 which is formed by the flow control knob 308 and the bottom plate 404 of the flow control cylinder 314. The flow/cutoff button 310 is connected to a cap 424 which is in contact with the end of the shaft 326. The cap 424 has a series of annular tabs 426 which have roughly the same diameter as the button chamber 422. The annular tabs 426 are seated on a ridge in the button compartment which has a series of deep and shallow slots for the annular tabs 426 to rest in. The cap 424 thus may be rotated to an inward and outward position in the chamber 422 when the button 310 is depressed. A spring 428 is provided between the cap 424 and the push button 310 in order to bias the button 310 in an outward position as shown in FIG. 8.

The operation of the valve 300 is similar to that of the valve unit 12 in FIGS. 1–4. Flow control may be achieved by turning the flow control knob 308 thereby rotating the flow control cylinder 314 and flow control socket 332 and regulating the flow rate through the outer inlet aperture 322 by the alignment of the inner inlet aperture 323. When the valve 300 is closed, pushing the button 310 will cause the plunger 328 to separate from the diaphragm 330 creating fluid flow through the aperture 370. The pressure from this flow causes the diaphragm 330 to deform, creating fluid flow through the aperture 370. The fluid pressure on the plunger 328 and the diaphragm 330 overcomes the fluid pressure in the intermediate chamber 320 to compress the spring 392. The diaphragm 330 remains deformed and the plunger 328 is maintained in a position to create fluid flow through the center aperture 348 by the shaft 326 being locked in place by the cap 424 whose tabs 426 are locked in the shallow slots. Pushing the button 310 again will cause the tabs 426 to rotated to the deep slots. This causes the cap 424 to move to the outward position, releasing the spring 392 which forces the plunger 328 and diaphragm 330 down, cutting off fluid flow through the center aperture 348. The fluid pressure on the diaphragm 330 and the flat surface 360 of the plunger 328 causes a seal between the diaphragm 330 and the center aperture 348 cutting off fluid flow to the outflow chamber 318.

Figure 10:
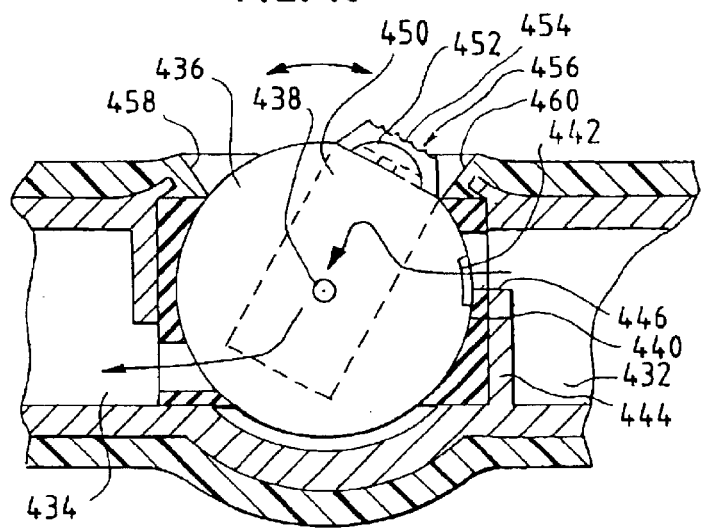
FIG. 10 is a side view of an alternate embodiment of a one touch valve integrated with a flow control device.
Figure 11:
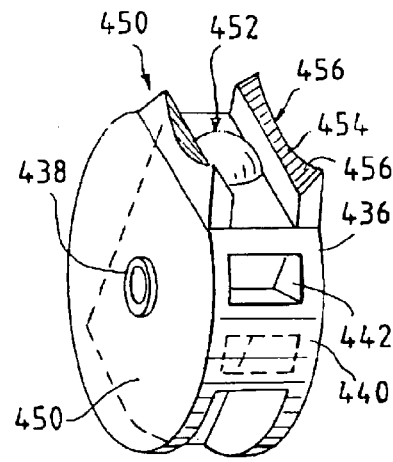
FIG. 11 is a perspective view of the flow control drum of the flow control device in FIG. 10.

Simultaneous flow rate control and flow cutoff may be performed in other different configurations other than the valve unit 12 in FIGS. 1–4 or the integrated control valve 300 shown in FIG. 9. FIGS. 10–11 show a cutaway side view and a perspective view of a rotating flow control 430. The rotating flow control unit 430 provides both flow rate as well as flow shutoff control between an inlet conduit 432 and an outlet conduit 434. The rotating flow control unit 430 has a flow control drum 436 which is mounted to rotate on a pivot point 438. The flow control drum 436 has a circular wall 440 which has an inlet 442. The circular wall 440 is in sealed contact with a wall 444 which plugs the inlet conduit 432. The wall 444 has an aperture 446 which is approximately the same area cross-section as the inlet 442. By rotating the flow control drum 436 on the pivot point 438 and exposing increasing or decreasing areas of the cross-section of the inlet 442 to fluid flow from the aperture 446, the fluid flow rate through the flow control drum 436 may be regulated. The fluid flows out from the flow control drum to the outlet conduit 434.

The flow control drum 436 has a cutoff valve 450 which is interposed between the inlet 432 and the outlet conduit 434. The cutoff valve 450 is one touch activated with a diaphragm, plunger and interior configuration similar to that of the valve unit 12 in FIGS. 1–4 above. These components are not shown here for simplicity of explanation. The cutoff valve 450 has a push button 452 which extend s from the circular wall 440. When pushed, the push button 450 activates the flow and cuts off the fluid flow in a manner identical to the cap 160 and button cover 164 in FIGS. 1–4. The push button 452 is seated in a detent member 454 which extends from the circular wall 440. The detent member 454 has a ridged surface 456 to allow for better control of the drum by a user's thumb or finger. The detent member 454 is rotated with the drum 436 between two stop members 458 and 460. The flow rate varies depending on the position of the detent member 454 between the stop members 458 (fully open) and 460 (fully closed).

Figure 12:
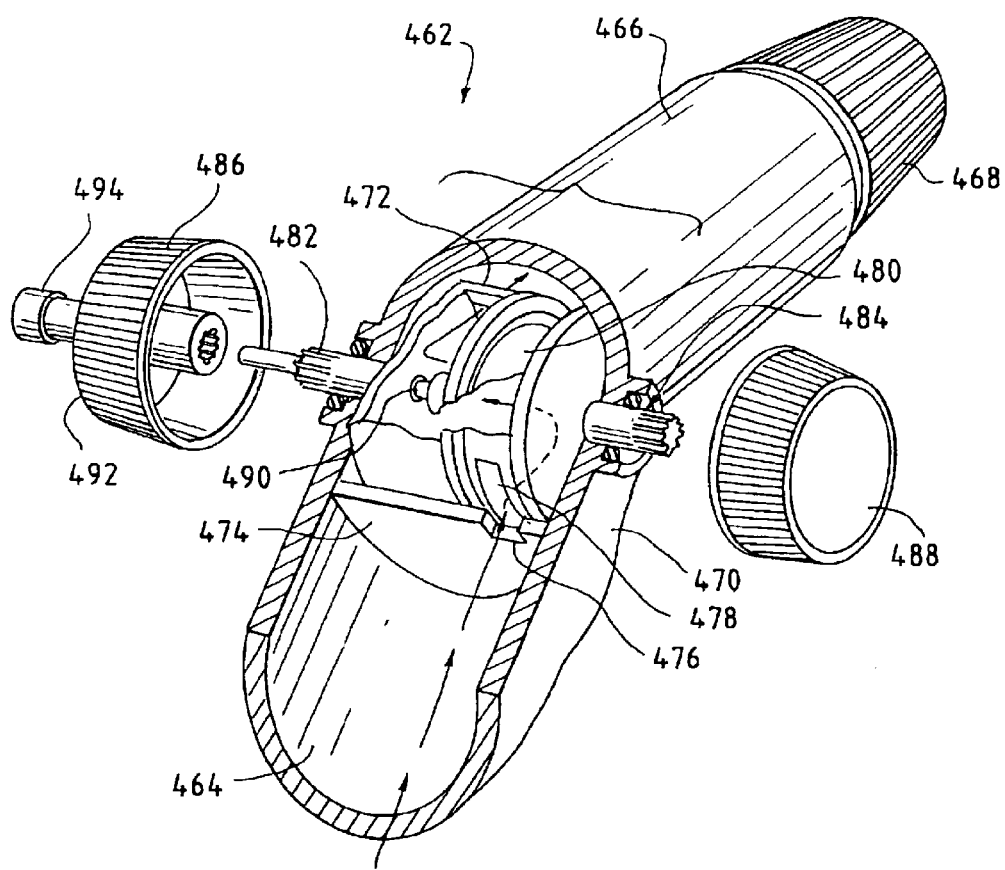
FIG. 12 is a perspective cutaway view of an alternate embodiment of a one touch valve integrated with a flow control device.

Another alternative combination flow rate control and shutoff valve unit is shown in conjunction with a adjustable flow hose nozzle 462 in FIG. 12. The hose nozzle 462 has an inlet portion 464 and an outlet portion 466. The outlet portion 466 is coupled to a nozzle head 468. The flow rate and flow cutoff is controlled by a one touch flow valve unit 470. The valve unit 470 has a rotatable flow cylinder 472 which is mounted on a valve seat 474. The valve seat 474 has an outer aperture 476 in fluid communication with the inlet portion 464 and the flow cylinder 472 has a corresponding inner aperture 478. The dow rate is adjusted by rotating the flow cylinder 472 a nd ex posing part to all of the inner aperture 478 to the outer aperture 476. The fluid flow through the flow cylinder 472 to the outlet portion 466 is controlled by a diaphragm 480 which functions similarly to the valve unit 12 in FIGS. 1–4.

The ends of the cylinder 472 each have a hollow shaft 482 and 484. The hollow shafts 482 and 484 are attached to dials 486 and 488 respectively. The dials 486 and 488 each may be turned which rotate the flow cylinder 472 in relation to the valve seat 474 which controls the flow rate. The diaphragm and thus flow through the cylinder 472 is controlled by a horizontal shaft 490 which extends through the dial 486. The dial 486 has a flat side surface 492 which holds a control button unit 494. The control button unit 494 is a push-push unit which activates and cuts off flow through the flow cylinder 472 in a manner similar to that of the valve unit 12 in FIGS. 1–4. The dials 486 and 488 allows a user to activate fluid flow by the control button unit 494 as well as regulate flow rate by turning the dials 486 and 488. A strap (not shown) may connect the dials 486 and 488 to assist in ambidextrous flow control operation.

Figure 13:
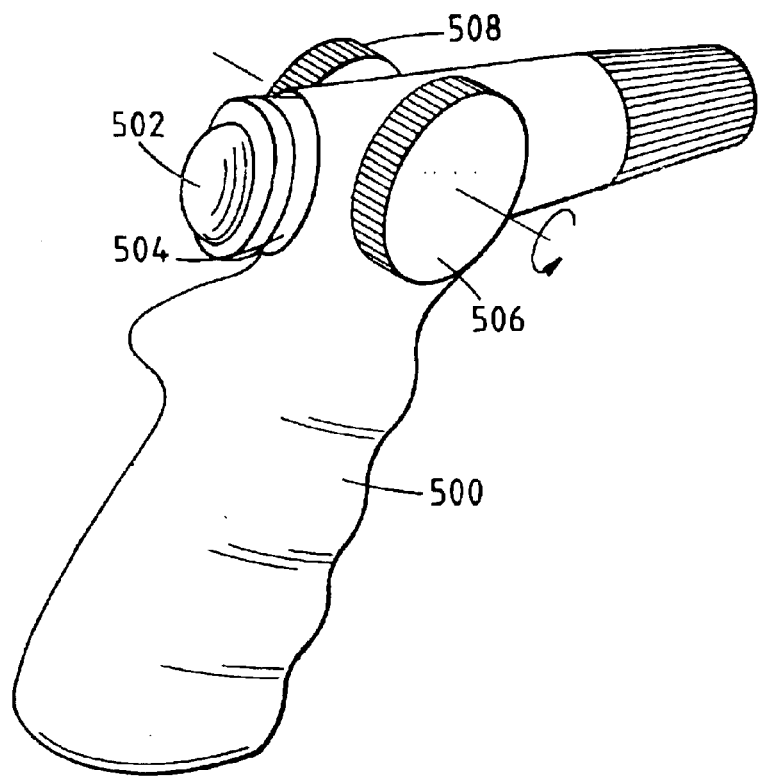
FIG. 13 is a perspective view of an alternate embodiment of a separate one touch valve and flow control dial on a pistol hose nozzle.
Figure 14:
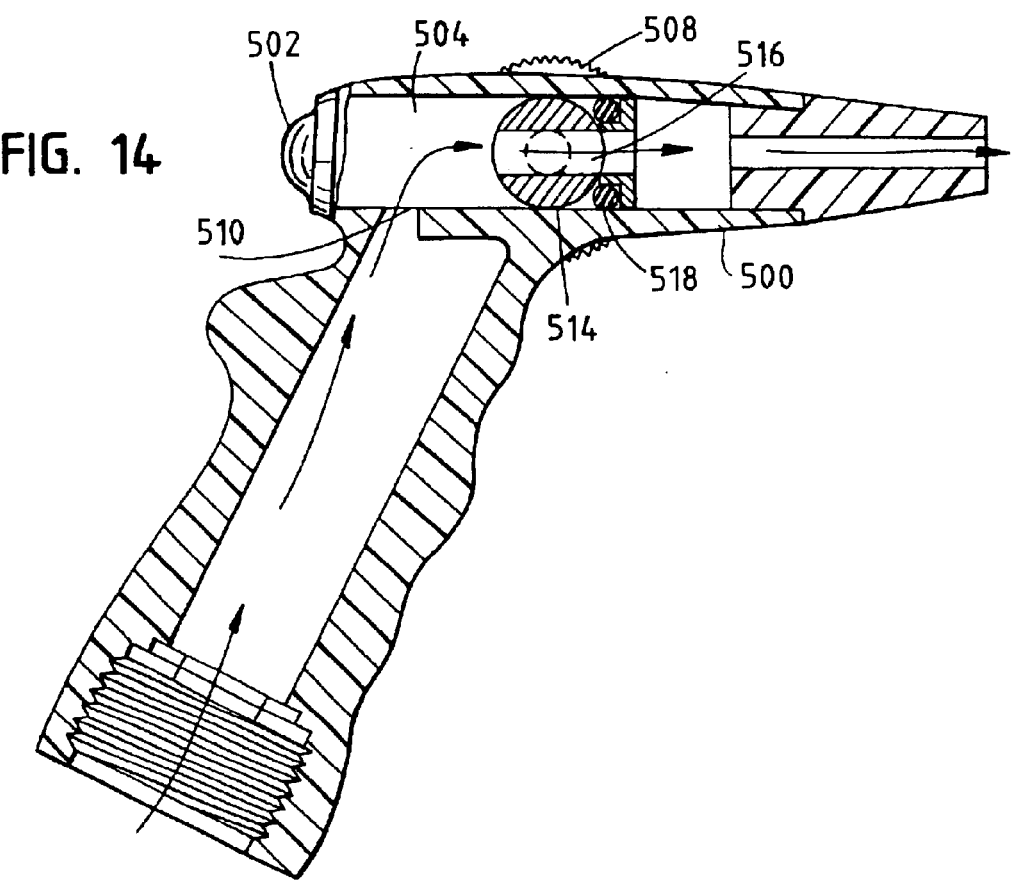
FIG. 14 is a cutaway view of the hose nozzle in FIG. 13.

The one touch control and the flow rate controls may be separated from each other as well. FIGS. 13–14 shows a pistol hose nozzle 500 with both one touch flow cutoff control and a separate flow rate control. The pistol hose nozzle 500 has a rubber boot 502 which is connected to a button (not shown) of a one touch valve unit 504 which functions in a manner similar to the valve unit 12 in FIGS. 1–4. The pistol hose nozzle 500 also has a pair of side dials 506 and 508 allow flow rate control. Rotating the side dials 506 and 508 varies the rate of fluid flow from the hose nozzle 500.

The one touch valve unit 504 has an inlet 510 which leads to a diaphragm and plunger (not shown) similar to the valve unit 12 in FIGS. 1–4. The fluid leaves the one touch valve unit 504 via an outlet 512. The dials 506 and 508 are coupled to a ball valve 514 which has an interior passage 516. The ball valve 514 may be rotated to align the interior passage 516 with the outlet 512 in order to control flow rate. The ball valve 514 is sealed within the interior of the pistol hose nozzle 500 via an O-ring 518.

Another example of separating the one touch flow cutoff and the flow rate control may be shown in the flow control configuration 520 shown in FIG. 15. The flow control configuration 520 controls the fluid flow between an inlet 522 and an outlet 524. A flow control valve 526 is interposed between the inlet 522 and the outlet 524. The flow control valve 526 is a ball valve in this example but a cylindrical valve or other flow control valve may be used. The ball valve 526 has a fluid flow passage 528 which may be rotated to be aligned with the inlet 522 via a stem 530. The stem 536 is connected to a control knob 532.

After fluid exits the ball valve 526, it enters a fluid flow/cutoff valve 534 which operates similarly to the valve unit 12 in FIGS. 1–4. The fluid flow/cutoff valve 534 is activated using a push button mechanism 536 which moves a plunger 538 and a diaphragm 540 in relation to a valve chamber 542. It is to be understood that the fluid flow/cutoff valve 534 may be placed upstream of the ball valve 526.

A further combination flow rate and flow cutoff control 550 is shown in FIGS. 16–17. The flow rate between an inlet conduit 552 and an outlet conduit 554 is controlled by a rotating knob 556. The flow cutoff/activation between the inlet conduit 552 and the outlet conduit 554 is controlled by a cylindrical one touch cutoff valve 558. The fluid flow is activated or cutoff by pushing a pin 560 via a boot 562 which causes the cutoff valve 558 to function in a similar manner to the valve unit 12 in FIGS. 1–4.

The cutoff valve 558 is mounted within a horizontal cylindrical valve seat 564. The valve seat 564 has an inlet aperture 566 and the cutoff valve has an inlet aperture 568. The cutoff valve 558 moves in the valve seat 564 which aligns the inlet apertures 566 and 568 relative to each other in order to regulate fluid flow. A series of O-rings 570, 572 and 574 provides a water tight seal between the valve seat 564 and the cutoff valve 558. The rotating knob 556 is connected to a shaft 566 which in turn is mounted on the valve seat 564. The rotating knob 556 has an upper surface 576 which has a number of indentations 578 to facilitate gripping. The rotating knob 556 has a flat opposite surface 580 which has an arced cam track 5892. A pin 584 is connected to the exterior of the cutoff valve 558 and is moveable within a slot 586 on the valve seat 564. The end of the pin 584 is inserted in the cam track 582 and thus when the knob 556 is rotated, the pin moves in the slot 586 thus moving the cutoff valve 558 relative to the valve seat 564. This adjusts the apertures 566 and 568 in order to regulate flow rate.

Figure 18:
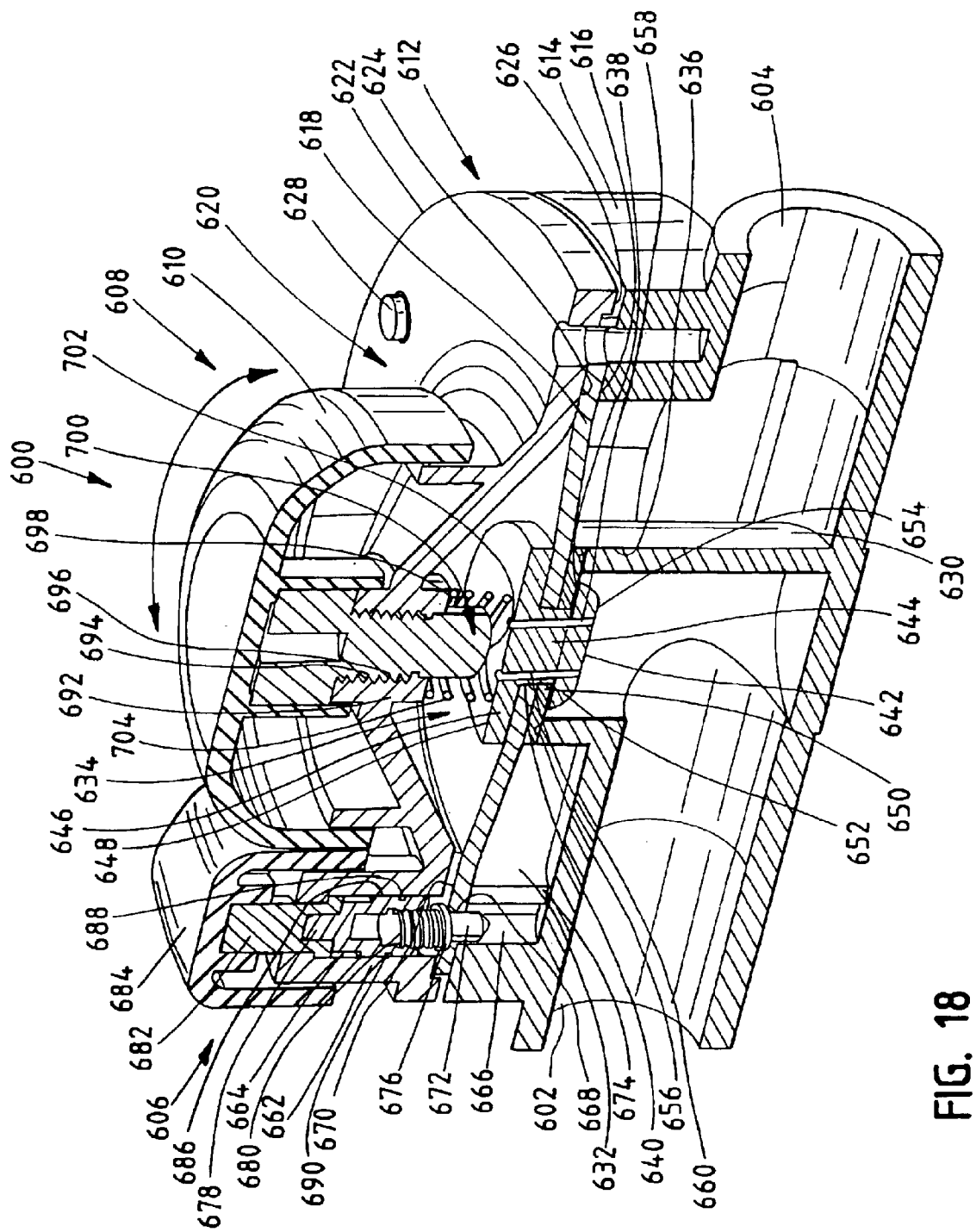
FIG. 18 is a cutaway perspective view of a one touch valve using a pilot valve according to another embodiment of the present invention.

Another embodiment of the one touch valve is a valve unit 600 which is shown in FIG. 18. The valve unit 600 regulates the fluid flow between an inlet conduit 602 and an outlet conduit 604. The valve unit 600 has a one touch pilot valve control 606 and a flow control unit 608. The one touch pilot valve control 606 allows a user to cut off or enable the flow of fluid between the inlet conduit 602 and the outlet conduit 604. The flow control unit 608 has a rotating knob 610 which allows a user to control the flow rate of the fluid flowing between the inlet conduit 602 and the outlet conduit 604.

The valve unit 600 has a valve housing 612 which defines a valve chamber 614. The valve chamber 614 has a circular top surface 616. A diaphragm 618, which is made of a resilient flexible material preferably rubber or an elastomeric polymer is seated on the circular top surface 616. A top member 620 has a circular rim 622 which has a lower surface 624 and an overhanging lip 626. The overhanging lip 626 pinches the edges of the diaphragm 618 between the lower surface 624 of the top member 620 and the circular top surface 616 of the valve chamber 614. The top member 620, diaphragm 618 and valve housing 612 are joined by a series of bolts 628 for turf requirements in this example. Of course it is to be understood that these components may be attached in other means such as by sonic weld, bayonet, glue etc.

The inlet conduit 602 is connected to a central conduit which is a cylinder 630 in this example, but other shapes may be used. A lower chamber 632 is defined by the central cylinder 630, the outside surface of the inlet conduit 602, and the bottom surface of the diaphragm 618. An upper chamber 634 is formed by the top member 620 and the top of the diaphragm 618. The central cylinder 630 has an outlet 636 providing fluid communication with the lower chamber 632 which is in fluid communication with the outlet conduit 604. The outlet 636 is formed by a shoulder 638. The diaphragm 618 has a center hole 640 which holds a plunger 642. The plunger 642 has a cylindrical core member 644 which is held by the center hole 640 of the diaphragm 618. The core member 644 is connected to a top disk 646 which has a flat top surface 648 and an opposite bottom disk 650 which has a plug 652 with a bottom surface 654 forming a rim edge 656. The plug 652 has the same diameter as the central cylinder 630 and in combination with the rim edge 656 creates a seal with the shoulder 638 of the central cylinder 630. A pair of small diameter holes 658 and 660 extend through the top disk 646, core member 644 and bottom disk 650 to provide fluid access between the central cylinder 630 and the upper chamber 634.

The top member 620 has a pilot valve structure 662 extending from the circular rim 622. The pilot valve structure 662 is roughly cylindrical in shape and forms a button chamber 664 and a pilot chamber 666. The button chamber 664 and the pilot chamber 666 are separated by the edge of the diaphragm 618 which includes a hole 668. The hole 668 provides fluid access between the button chamber 664 and the pilot chamber 666. A conduit 670 is located in the lip 626 of the top member 620 which provides fluid access between the upper chamber 634 and the button chamber 664. A pilot pin 672 may be positioned up or down in the button chamber 664 to cover or uncover the hole 668. A slit 674 provides fluid access between the pilot chamber 666 and the lower chamber 632.

The pilot pin 672 has an annular ridge 676. A pin cap 678 is installed over the pilot pin 672 to rest on the annular ridge 676. A spring 680 is installed between the cap 678 and the ridge 676. A stem 682 is connected to the top of the cap 678. The stem 682 is connected to a button cover 684. The cap 678 has an exterior surface 686 with an annular groove 688. The annular groove 688 has an O-ring 690 to provide a seal between the cap 678 and the pilot valve structure 662.

The top member 620 has a center collar 692 which has a socket 694 with a threaded interior surface 696. The collar 692 has a lower shoulder 698. An inlet adjustment screw 700 intermeshes with the threaded interior surface 696. The inlet adjustment screw 700 has a contact end 702. The contact end 702 may be fixed relative to the top surface 648 of the plunger 642 by rotating the screw 700. The opposite end of the screw 700 is coupled to the flow control knob 610. A spring 704 is mounted around the inlet adjustment screw 700 between the lower shoulder 698 of the collar 692 and the top surface 648 of the plunger 642. It is to be understood that other mechanisms may be used for the inlet adjustment screw to control flow such as a smooth shaft with appropriate mechanisms such as a slide switch or a toggle to adjust the position of the shaft.

The valve unit 600 functions as follows. When the valve unit 600 is closed, the pilot pin 672 is in a down position which plugs the hole 668, preventing fluid flow between the button chamber 664 and the lower chamber 632. The small diameter holes 658 and 660 provide fluid flow to the upper chamber 634 via the inlet conduit 602 and the central cylinder 630. The diaphragm 618 and the plunger 648 are thus sealed against the shoulder 638 of the central cylinder 630 by fluid pressure in the upper chamber 634 acting against the top surface 648 and the diaphragm 618 as well as force from the spring 704. The seal prevents fluid from the central cylinder 630 from flowing to the lower chamber 632 and the outflow conduit 604.

When the push button cover 684 is pushed, the pilot pin 672 is unlocked and is forced out of the hole 668 by the spring 680. The opening of the hole 668 causes fluid flow from the upper chamber 634 to the button chamber 664, through the hole 668, to the pilot chamber 656 and through the slit 674 to the lower chamber 632. The draining of fluid from the upper chamber 634 causes a drop in pressure on the top surface 648 of the plunger 642 and the diaphragm 618. The water pressure in the central cylinder 630 then forces the bottom surface 654 of the plunger 642 off of the shoulder 638 of the central cylinder 630 and deforms the diaphragm 618 upward thereby opening the top of the central cylinder 630 to fluid flow between the central cylinder 630 and the lower chamber 632 leading to the outlet conduit 604. The resulting fluid pressure on the bottom surface 654 of the plunger 642 serves to keep the valve open by forcing the plunger 642 against the contact end 702 of the inlet adjustment screw 700. This motion also compresses the spring 704 between the top surface 648 of the plunger 648 and the shoulder 698 of the collar 692.

When the button cover 684 is pushed again, the pilot pin 672 is locked down, compressing the spring 680 and plugging the hole 668. Sufficient force is accumulated by a combination of the compressed spring 704 and the fluid accumulating in the upper chamber 634 to push the plunger 642 down to the shoulder 638 of the cylinder 630 forming a seal and preventing fluid flow to the lower chamber 632.

The flow rate is regulated by turning the knob 610. Rotating the knob 610 causes the contact end 702 of the inlet adjustment screw 700 to be moved relative to the top surface 648 of the plunger 642. This distance determines how much space is created between the diaphragm 618 and the plunger 642 and the shoulder 638 of the central cylinder 630. The flow rate will vary depending on the spacing between the plunger 642 and the shoulder 638.

Figure 19:
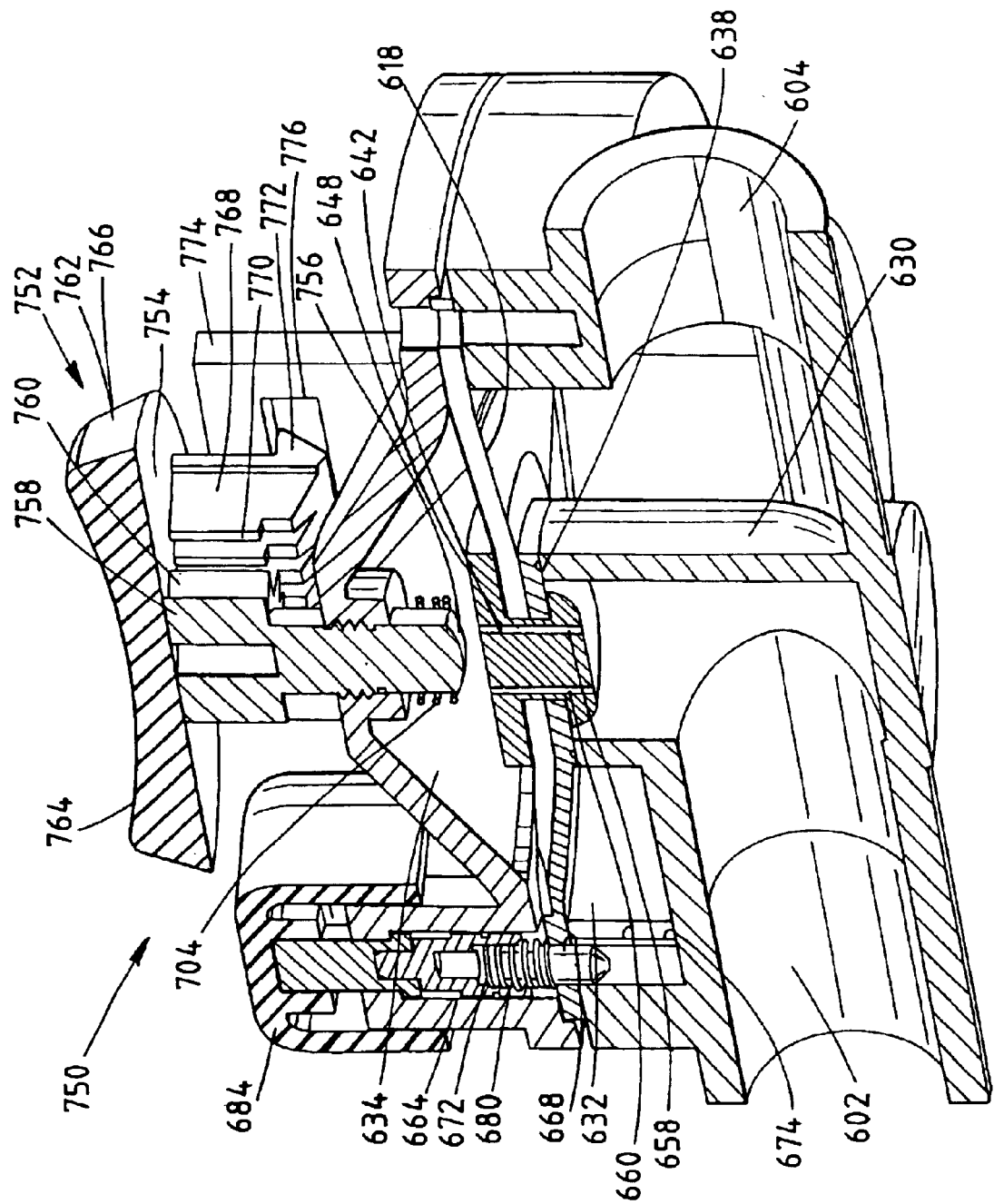
FIG. 19 is a cutaway perspective view of a one touch valve using a pilot valve and slide control according to another embodiment of the present invention.

FIG. 19 shows a pilot-type flow control 750 similar to the flow control 600 in FIG. 18. Like parts in FIG. 19 are labeled the same as their counterparts in FIG. 18. The flow control 750 has a slide control 752 for the regulation of flow rate. The slide control 750 allows control of a modified inlet adjustment screw 754. The inlet adjustment screw 754 functions in an identical manner in regulating flow rate to the inlet adjustment screw 700 in FIG. 15. The inlet adjustment screw 754 has a contact end 756 which is in fixed relation to the top surface 648 of the plunger 642. The inlet adjustment screw 754 has an opposite end 758 with a gear 760.

The slide control 752 has a slider 762 which has a top surface 764. The top surface 764 may be textured for better grip to a user's finger. An opposite bottom surface 766 has a rack 768 extending from it. One side of the rack 768 has gear teeth 770 while the opposite side of the rack 768 has a tab 772. The slider 762 is mounted on a support 774 which has a horizontal slot 776. The tab 772 of the rack 768 is inserted in the slot 776 to allow the slider 762 to be articulated between the sides of the slot 776. The teeth of the gear 760 intermesh with the teeth 770 of the rack 768. Thus, the inlet adjustment screw 754 may be rotated by moving the slider 762 within the slot 776. The flow rate of the valve is thus controlled by the slide control 750.

Figure 20:
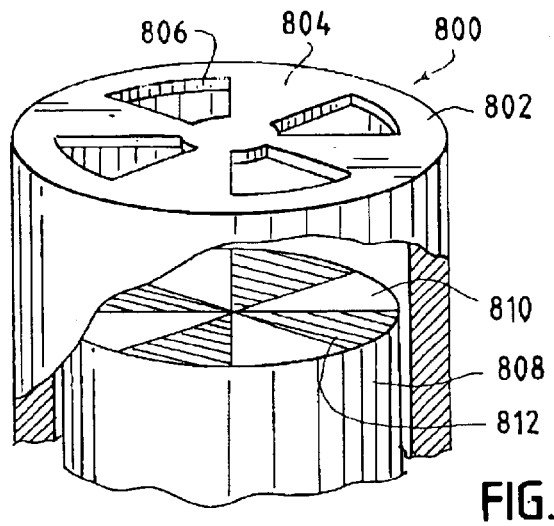
FIG. 20 is a perspective view of an alternate push button structure providing a visual indication of button position for the valve in FIG. 1.

A cross-section exploded view of a modified cap 800 is shown in FIG. 20. The button unit 800 may be substituted for the cap 160 and button cover 164 of the valve unit 12 or of any of the other examples given above. The button unit 800 has a cylindrical button cover 802 which has a top surface 804 with a number of radial windows 806. The button cover 802 is installed over a cap 808. The cap 808 has a top surface 810 with a number of painted sections 812. The painted sections 812 provide an indication through the windows 806 whether the valve is on or off when the cap 808 is rotated from the button cover 802 being depressed.

Figure 21A:
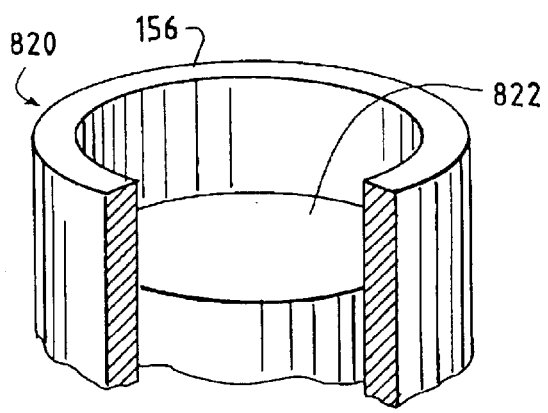
FIGS. 21 A & B are perspective views of another alternate push button structure providing a visual indication of button position for the valve in FIG. 1.
Figure 21B:
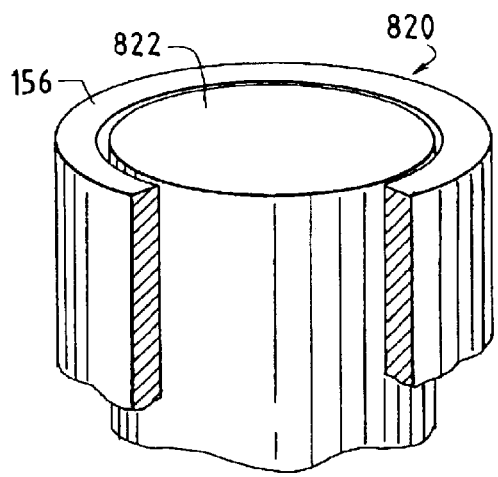

Another push button indicator 820 is shown in FIGS. 21A & 21B. The push button indicator 820 has a button cover 822 which functions in an identical manner to the button cover 164 in the valve unit 12. The button cover 822 is in contact with a cap which is identical to the cap 160 in the valve unit 12. The button cover 822 is kept depressed relative to the button surface 156 of the button chamber 150 when the valve unit 12 is on by the tabs 162 in relation to the deep slots on ridged pattern on the inner compartment 152. The button cover 822 is flush with the button surface 156 when the 8 valve unit if off as shown in FIG. 21B.

Figure 22A:
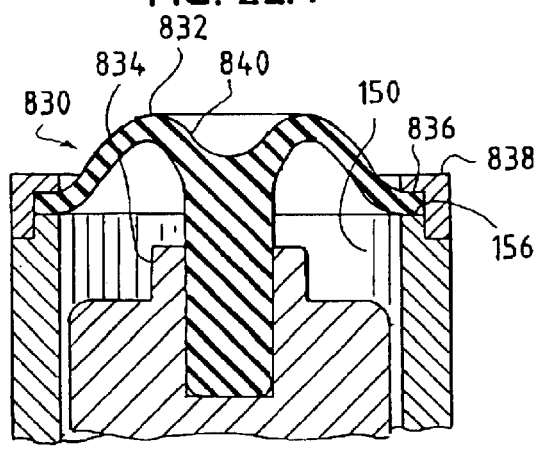
FIGS. 22A & B are perspective views of another alternate push button structure providing a visual indication of the button in an on and off position for the valve in FIG. 1.
Figure 22B:
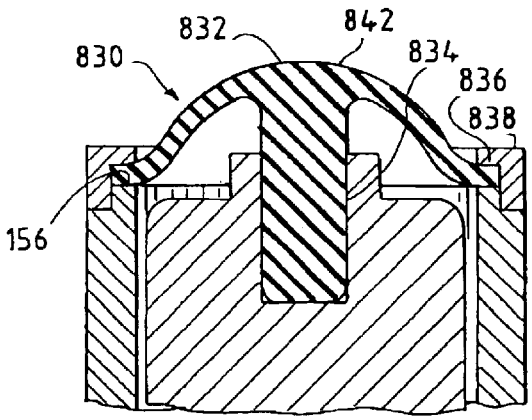

A further push button indicator 830 is shown in FIGS. 22A & 22B. The push button indicator 830 has a button cover 832 which is a rubber boot. The button cover 832 is attached to a cap 834 which functions in an identical manner to the cap 160 in the valve unit 12 in FIGS. 1–4. The button cover 832 has an edge 836 which is held by a retaining ring 838 to the button surface 156 of the button chamber 150. When the valve unit is on the cap 834 is in a down position as shown in FIG. 22A. The button cover 832 forms a dimple 840 which indicates to a user that the valve is on. When the button cover 832 is pressed, the dimple pops up with the cap 834 and a hump 842 is formed as shown in FIG. 22B to indicate the valve is off.

The application of the valve shutoff is not restricted to hose nozzles. FIGS. 23A–23K show certain applications of the one touch valve unit explained above. FIG. 20A shows an inline one touch valve 850 similar to the valve unit 12 which is mounted on a hose 852. The in line valve 850 has a button 854 which is mounted on a collar 856. The button 854 allows a user to turn fluid flow on or off in the hose 852.

Figure 23A:
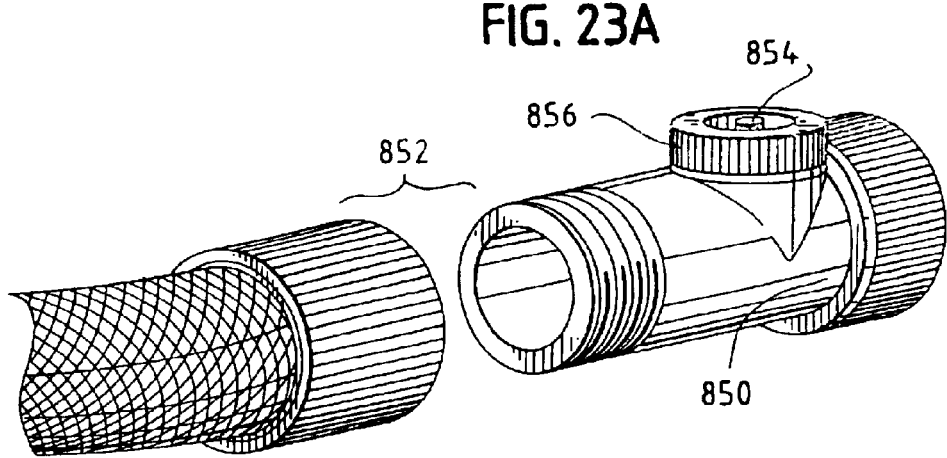
FIGS. 23A–23K are perspective views of different examples of applications of a one touch flow valve.
Figure 23B:
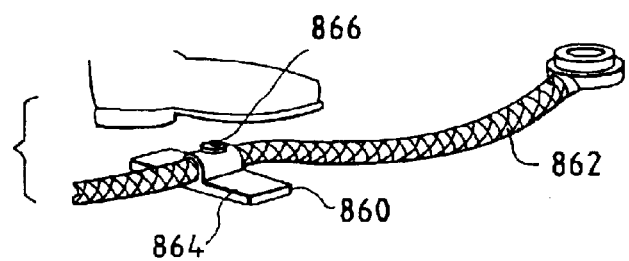

FIG. 23B shows a one touch valve 860 similar to the valve unit 12 which is mounted on a hose 862. The valve 860 has a base 864 which sits on the ground. The valve 860 allows a user to turn fluid flow on or off by pressing a button 866 with their foot.

Figure 23C:
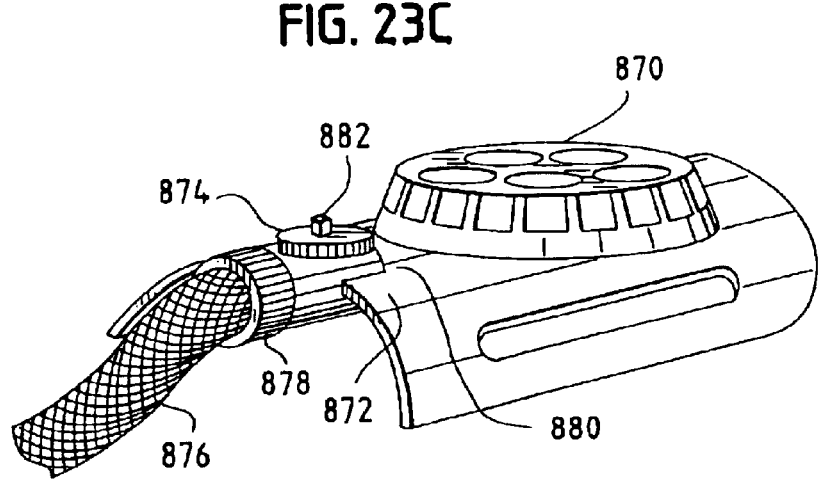

FIG. 23C shows a lawn sprinkler 870 which has a hose coupler 872 which is connected to a valve module 874. A hose 876 supplies water to the lawn sprinkler 870. The valve module 874 has an outlet 878 which is coupled to the hose coupler 872 and an inlet 880 which is coupled to the end of the hose 876. The valve module 874 has a push button 882 which activates or cuts off fluid flow to the outlet 878. The valve module 874 functions in a similar manner to the valve unit 12 in FIGS. 1–4. The valve module 874 may be used as a flow cutoff switch to any device which may be mated to a hose such as other types of sprinklers.

Figure 23D:
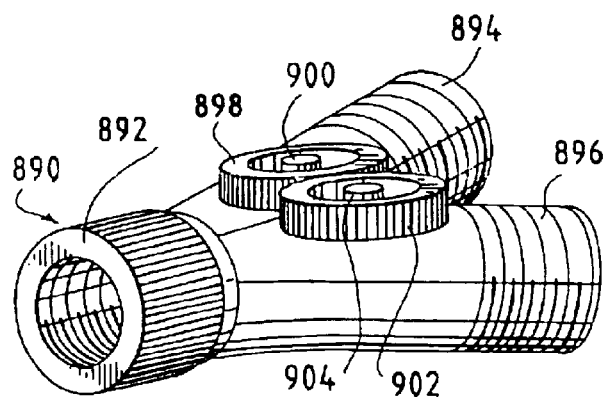

The cutoff unit may be installed in different branching configurations. For example, FIG. 23D shows a Y-branch type hose connector 890. The hose connector 890 has an inlet 892 and a pair of outlets 894 and 896 which allow attachment of two hoses to a single fluid source coupled to the inlet 892. The flow through the outlet 894 is controlled by a valve module 898 which has a push button 900 which activates or cuts off fluid flow to the outlet 894. Similarly, the flow through the outlet 896 is controlled by a valve module 902 which has a push button 904 which activates or cuts off fluid flow to the outlet 896. The valve modules 898 and 902 function in a similar manner to the valve unit 12 in FIGS. 1–4.

Figure 23E:
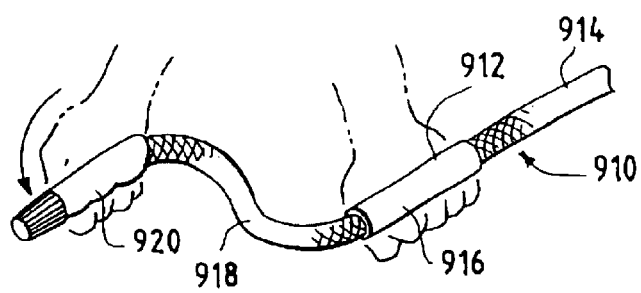

FIG. 23E shows a separated function pistol nozzle and wand apparatus 910. The apparatus 910 has a hand-grip portion 912 which is coupled to a hose 914. The hand-grip portion has a one touch activation button 916 which controls a one touch valve similar to the valve unit 12 in FIGS. 1–4. The user grips the hand-grip portion 912 and may cut off or activate fluid flow via the button 916. A tube 918 is attached to the hand-grip portion 912. The tube 918 has a nozzle head 920 which allows a user to vary the spray pattern.

Figure 23F:
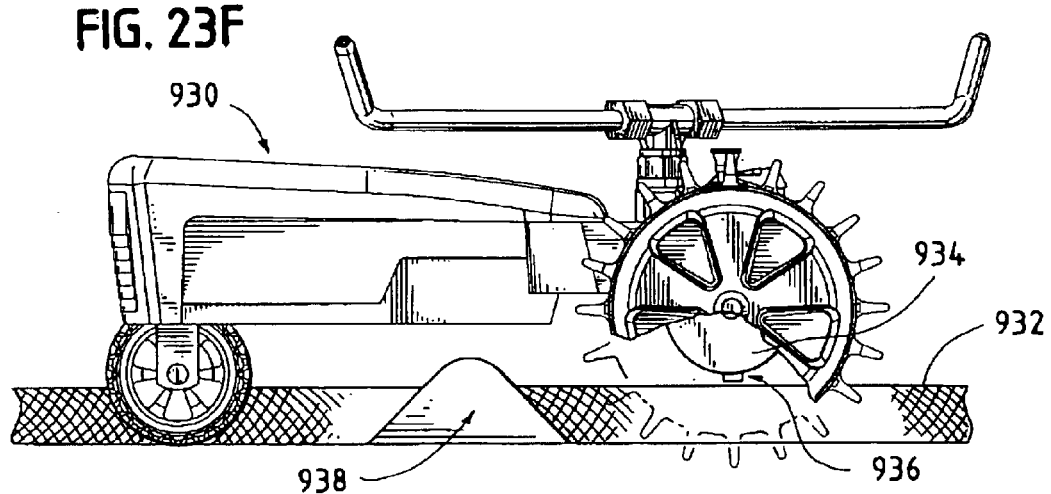

FIG. 23F shows the use of a one touch control with a traveling sprinkler 930 which tracks a hose 932. The traveling sprinkler 930 has a valve unit 934 with a push button control 936 which cuts off and activates water flow to the traveling sprinkler 930 in a manner similar to the valve unit 12 in FIGS. 1–4. The traveling sprinkler 930 is water propelled via water supplied by the hose 932. An actuation ramp 938 is placed on the hose 932. When the traveling sprinkler 930 moves into the actuation ramp 938, the ramp 938 pushes the button control 936 causing the water to be shut off to the sprinkler 930 and halting the forward motion. Alternatively, the button control could also be installed on the hose and a catch mechanism could shut off flow when the traveling sprinkler hits the button control.

Figure 23G:
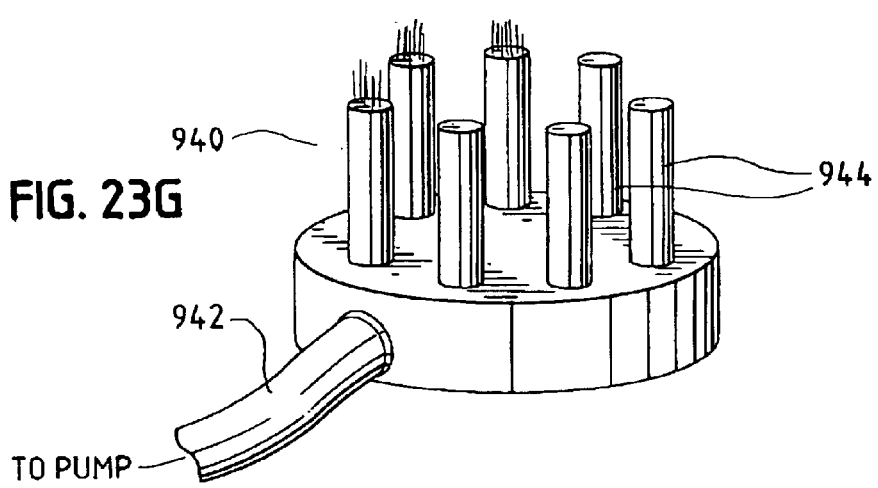

The one touch control also provides instantaneous flow activation or cutoff. This may have many applications. For example, FIG. 23G is a fountain 940 which has a main water supply pipe 942. The fountain 940 has a number of pipes 944 which shoot water in a specified pattern. One touch valves (not shown) similar to the valve unit 12 regulate the flow of water to the pipes. The valves are activated by a mechanical cam mechanism (not shown) which activates and cuts off flow to each pipe 944 in a set pattern. The mechanical cam mechanism may be replaced with electro-mechanical components.

Figure 23H:
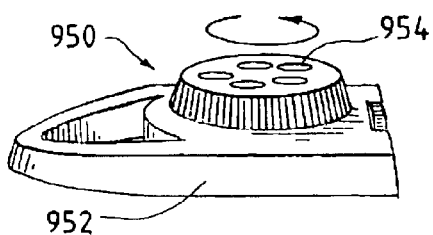
Figure 23I:
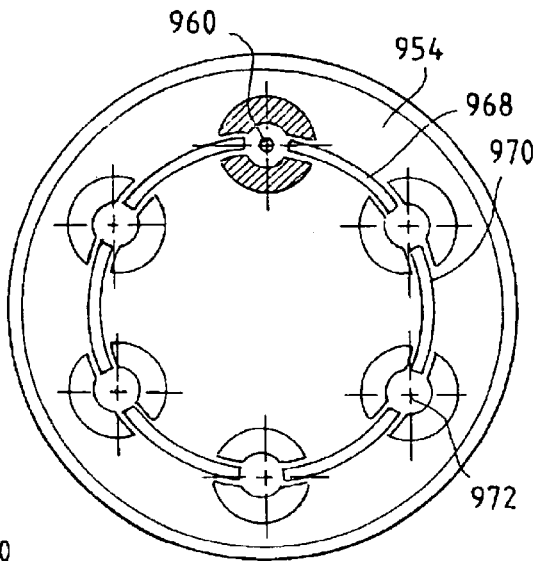
Figure 23K:
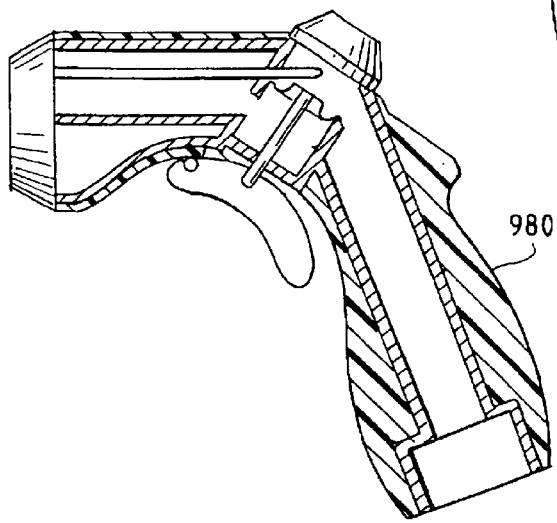
Figure 23J:
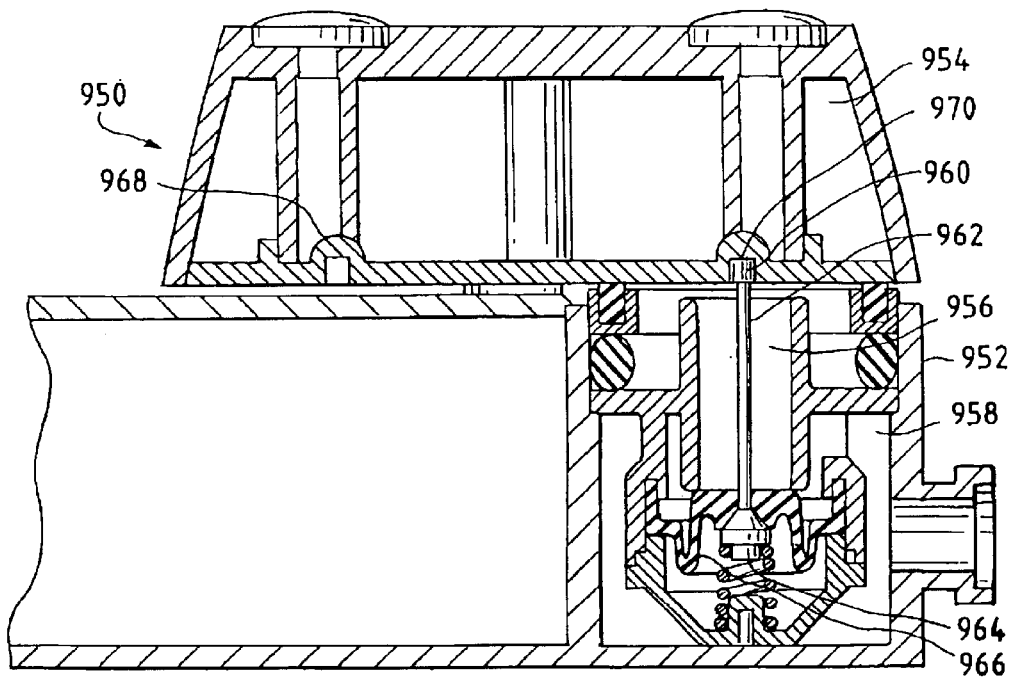

FIGS. 23H–23J shows a multiple spray pattern sprinkler 950. The sprinkler 950 has a body 952 which is mounted to a rotating turret 954. The turret 954 has a number of different spray pattern heads which are alignable to an outlet passage 956 in the body 952. The body 952 has a one touch activation valve 958 which is similar to the valve unit 12 in FIGS. 1–4. The valve 958 is activated by a one touch pin 960 which is connected to shaft 962 which moves a plunger 964 in relation to diaphragm 966. The pin 960 is seated in a circular trough 968 in the bottom surface of the turret 954. The trough 968 has mesas 970 between the positions of spray pattern heads and indentations 972 where one of the spray heads are aligned to the outlet passage 956. When the turret 954 is rotated between spray heads, the pin 960 is in contact with the mesas 970 of the trough 968 which keeps the valve 958 off thus preventing water flow from the outlet passage 956. When the turret 954 is rotated so one of the spray heads is aligned to the outlet passage 956, the pin 960 is moved to contract with an indentation 972 thus turning the valve 978 on and causing water to flow out of the selected spray pattern head.

The turret configuration in FIGS. 23H–J may also be used on a pistol-type nozzle 980 shown in FIG. 23K. The nozzle 980 has a one touch valve unit 982 and rotating spray head 984 which operates similarly to the turret 954 in FIGS. 23H–23J.

The light touch required to cut off and activate fluid flow makes the valve unit 12 in FIGS. 1–4 compatible with electronic control for the activation. For example, the valve unit 12 could be activated by an electronic remote control device which activates a pulse-driven mechanical actuator to close or open the valve unit.

It will be apparent to those skilled in the art that various modifications and variations can be made in the method and system of the present invention without departing from the spirit or scope of the invention. Thus, the present invention is not limited by the foregoing descriptions but is intended to cover all modifications and variations that come within the scope of the spirit of the invention and the claims that follow.

What is claimed is:

1. A pistol hose nozzle allowing flow control comprising:
   a hand-grip portion connectable to a fluid source;
   a barrel portion having a fluid outlet;
   an exterior cylinder coupled to the hand-grip portion and the barrel portion, the exterior cylinder having a side wall with an outer inlet aperture in fluid communication with the hand-grip portion;
   a flow cylinder rotatably mounted within the side wall of the exterior cylinder, the flow cylinder defining an inflow chamber in fluid communication with the hand-grip portion and an outflow chamber in fluid communication with the barrel portion, the flow cylinder including an inner inlet aperture which allows fluid communication to an inflow chamber, an end plate and an intermediate plate having a center collar with an aperture;
   a flexible diaphragm having a sealing surface in contact with the collar to create a seal, an opposite surface, an aperture extending therethrough, an edge coupled to the intermediate plate and a small diameter hole providing fluid contact between the inflow chamber and an intermediate chamber defined by the intermediate plate of the flow cylinder;
   a plunger having a contact surface and an opposite diaphragm contact surface, the diaphragm contact surface creating a seal with the opposite surface of the diaphragm;
   a shaft having one end connected to the plunger and extending through the aperture of the diaphragm;
   a spring located between the end plate of the flow cylinder and the contact surface of the plunger;
   wherein pushing the shaft causes the plunger to separate from the diaphragm creating fluid pressure on the diaphragm contact surface to push the plunger toward the end plate, compressing the spring, and causing the diaphragm to separate from the collar causing fluid to flow from the inflow chamber through the aperture to the outflow chamber, and wherein releasing the shaft causes the spring to decompress, forcing the plunger and diaphragm away from the end plate re-establishing the seal between the sealing surface with the collar preventing fluid flow from the intermediate chamber to the outflow chamber.

2. The pistol hose nozzle of claim 1 further comprising a button structure coupled to an opposite end of the shaft, the button structure having a button cover, a button cap in contact with the opposite end of the shaft, the button cap in telescoping relation with the button cover, the button cap being rotatable between an inward position on depressing the button cap, and an outward position on depressing the button cap a second time.

3. The pistol hose nozzle of claim 2 further comprising a flow rate control knob coupled to the flow cylinder to allow rotation of the flow cylinder, wherein the flow rate knob is mounted over the end plate of the flow cylinder opposite the button structure.

4. The pistol hose nozzle of claim 2 further comprising a flow rate control knob coupled to the flow cylinder to allow rotation of the flow cylinder, wherein the control knob has a collar which supports the button structure.

5. The pistol hose nozzle of claim 2 further comprising:
   an flexible molded covering over the hose nozzle;
   a spring strip suspended over the button, wherein the molded covering may be squeezed in order to activate the valve.

6. The valve of claim 1 wherein the opposite diaphragm contact surface of the plunger is a conical shape and the contact surface of the diaphragm is a matching conical shape.

7. The valve of claim 1 wherein the diaphragm is a rubber material.

8. The valve of claim 1 wherein the diaphragm is an elastomeric polymer material.

9. A one touch actuation valve for allowing and preventing fluid flow between an inlet conduit and an outlet conduit, the valve comprising:
   a flow vessel defining an inflow chamber in fluid communication with the inlet conduit and an outflow chamber in fluid communication with the outlet conduit, the flow vessel including an end plate and an intermediate plate having a first aperture;
   a flexible diaphragm having a sealing surface in contact with the intermediate plate to create a seal over the first aperture, an opposite surface, a second aperture extending therethrough, an edge coupled to the intermediate plate and a small diameter hole providing fluid communication between the inflow chamber and an intermediate chamber defined by the intermediate plate and the flow vessel;
   a plunger having a contact surface and an opposite diaphragm contact surface, the diaphragm contact surface creating a seal with the opposite surface of the diaphragm;
   a shaft having one end connected to the plunger and extending through the second aperture;
   a spring located between the end plate of the flow vessel and the contact surface of the plunger;
   a locking mechanism in contact with the shaft, the locking mechanism having a push button and keeping the shaft in an extended and retracted position when the button is pressed;
   wherein keeping the shaft in the extended position causes the plunger to separate from the diaphragm creating fluid pressure on the diaphragm contact surface to push the plunger toward the end plate, compressing the spring, and causing the diaphragm to separate from the first aperture causing fluid to flow from the inflow chamber through the aperture to the outflow chamber, and wherein pushing to push button, releases the shaft into the retracted position, causing the spring to decompress, forcing the plunger and diaphragm away from the end plate reestablishing the seal between the sealing surface preventing fluid flow from the intermediate chamber to the outflow chamber.

* * * * *